United States Patent
Choi et al.

(10) Patent No.: US 8,743,815 B2
(45) Date of Patent: *Jun. 3, 2014

(54) METHOD AND BASE STATION FOR TRANSMITTING SA-PREAMBLE AND METHOD AND USER EQUIPMENT FOR RECEIVING SA-PREAMBLE

(75) Inventors: Jin Soo Choi, Anyang-si (KR); Han Gyu Cho, Anyang-si (KR); Jin Sam Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 78 days.

This patent is subject to a terminal disclaimer.

(21) Appl. No.: 13/500,251

(22) PCT Filed: Oct. 21, 2010

(86) PCT No.: PCT/KR2010/007241
§ 371 (c)(1),
(2), (4) Date: Apr. 4, 2012

(87) PCT Pub. No.: WO2011/049388
PCT Pub. Date: Apr. 28, 2011

(65) Prior Publication Data
US 2012/0195282 A1 Aug. 2, 2012

Related U.S. Application Data

(60) Provisional application No. 61/254,737, filed on Oct. 25, 2009, provisional application No. 61/255,495, filed on Oct. 28, 2009.

(30) Foreign Application Priority Data

Oct. 1, 2010 (KR) .................. 10-2010-0095925

(51) Int. Cl.
*H04W 4/00* (2009.01)

(52) U.S. Cl.
USPC .......................................... 370/329

(58) Field of Classification Search
USPC ................ 370/329, 338, 310; 455/452.1
See application file for complete search history.

(56) References Cited

U.S. PATENT DOCUMENTS

| 8,451,788 | B2 * | 5/2013 | Choi et al. | 370/329 |
| 8,509,170 | B2 * | 8/2013 | Park et al. | 370/329 |
| 2005/0084030 | A1 * | 4/2005 | Zhou et al. | 375/267 |
| 2006/0256709 | A1 * | 11/2006 | Yang | 370/206 |

(Continued)

FOREIGN PATENT DOCUMENTS

| WO | WO 2009/114478 A1 | 9/2009 |
| WO | WO 2009114478 A1 * | 9/2009 |
| WO | WO 2010145383 A1 * | 12/2010 |

OTHER PUBLICATIONS

Proposal for Advanced Preamble design with tone dropping support in the IEEE 802.16m Amendment, IEEE C802.16m-09/1409, Jul. 6, 2009.*

*Primary Examiner* — Mark Rinehart
*Assistant Examiner* — Peter Solinsky
(74) *Attorney, Agent, or Firm* — Birch, Stewart, Kolasch & Birch, LLP

(57) ABSTRACT

An SA-Preamble corresponding to an irregular system bandwidth different from a regular system bandwidth is configured to be as long as or larger than the irregular system bandwidth and transmitted. Thus, the performance of transmitting and receiving the SA-Preamble is increased.

14 Claims, 14 Drawing Sheets

(56) References Cited

U.S. PATENT DOCUMENTS

| | | | |
|---|---|---|---|
| 2008/0039107 A1* | 2/2008 | Ma et al. | 455/450 |
| 2010/0226322 A1* | 9/2010 | Choi et al. | 370/329 |
| 2012/0195282 A1* | 8/2012 | Choi et al. | 370/329 |

* cited by examiner

Fig. 9
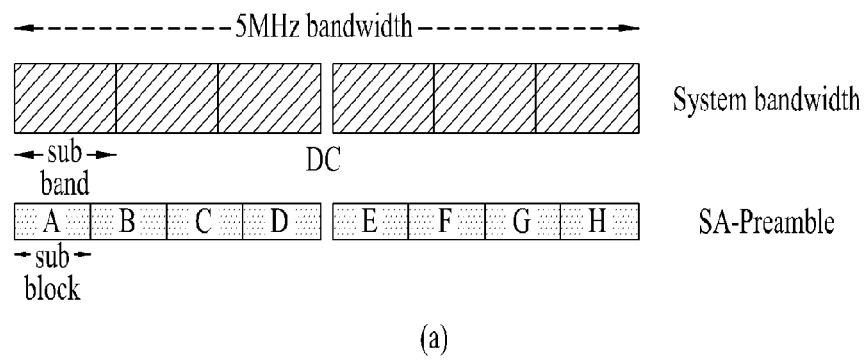
(a)
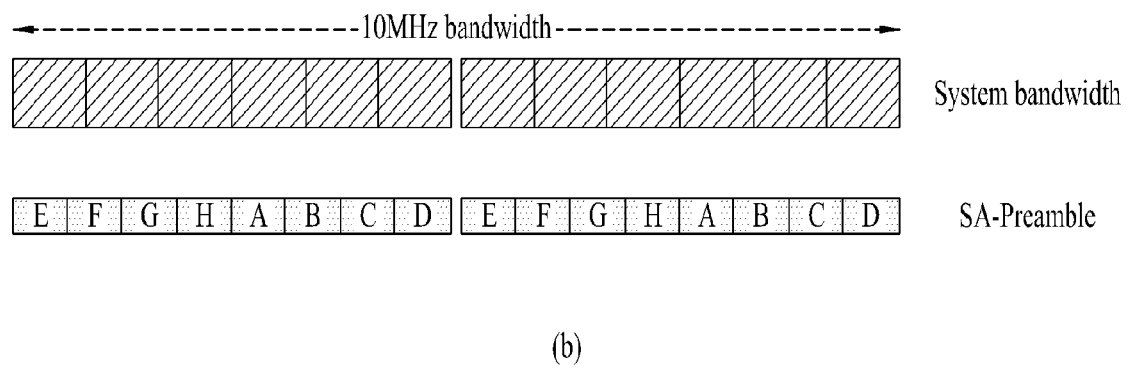
(b)

METHOD AND BASE STATION FOR TRANSMITTING SA-PREAMBLE AND METHOD AND USER EQUIPMENT FOR RECEIVING SA-PREAMBLE

CROSS-REFERENCE TO RELATED APPLICATIONS

This application is the National Phase of PCT/KR2010/007241 filed on Oct. 21, 2010, which claims priority under 35 U.S.C. 119(e) to U.S. Provisional Application Nos. 61/254,737 filed on Oct. 25, 2009 and 61/255,495 filed on Oct. 28, 2009 and under 35 U.S.C. 119(a) to KR 10-2010-0095925, filed in the Republic of Korea on Oct. 1, 2010, all of which are hereby expressly incorporated by reference into the present application.

TECHNICAL FIELD

The present invention relates to a wireless communication system, and more particularly, to a method and a Base Station (BS) for transmitting a Secondary Advanced (SA)-Preamble, and a method and a User Equipment (UE) for receiving an SA-Preamble.

BACKGROUND ART

FIG. 1 is a diagram illustrating a wireless communication system. Referring to FIG. 1, a wireless communication system 100 includes a plurality of BSs 110a, 110b and 110c and a plurality of User Equipments (UEs) 120a to 120i. The wireless communication system 100 can include a homogeneous network or a heterogeneous network. In this case, a network where different network entities coexist, such as a macrocell, a femtocell, a pico cell, and a relay station, is designated as the heterogeneous network. The BSs are fixed stations that perform communication with a UE. Each of the BSs 110a, 110b, and 110c provides a service to specific local regions 102a, 102b, and 102c. In order to improve system throughput, the specific regions can be divided into a plurality of smaller regions 104a, 104b and 104c. Each of the smaller regions may be designated as a cell, sector or segment. In case of an Institute of Electrical and Electronics Engineers (IEEE) 802.16 system, cell identity is given based on the whole system. On the other hand, sector or segment identity is given based on the specific region where each BS provides a service, and has a value of 0 to 2.

The UEs 120a to 120i can generally be distributed, fixed or mobile in the wireless communication system. Each UE can perform communication with one or more BSs through an UpLink (UL) and a DownLink (DL) at a random time. The BS and the UE can perform communication with each other by using Frequency Division Multiple Access (FDMA), Time Division Multiple Access (TDMA), Code Division Multiple Access (CDMA), Single Carrier-FDMA (SC-FDMA), Multi Carrier-FDMA (MC-FDMA), Orthogonal Frequency Division Multiple Access (OFDMA) or their combination. Herein, the uplink means a communication link from the UE to the BS while the downlink means a communication link from the BS to the UE.

The BSs 110a, 110b and 110c communicate with the UEs 120a to 120i in a predetermined system bandwidth. If only a few regular system bandwidths are available for communication, the efficiency of frequency resource use is decreased. In this context, techniques for configuring system bandwidths other than regular system bandwidths for use in communication have been proposed in order to more efficiently use frequency resource. The techniques include carrier aggregation and tone dropping. In carrier aggregation, a wider system bandwidth than a regular system bandwidth is serviced by grouping a plurality of regular system bandwidths, whereas in tone dropping, a narrower system bandwidth than a regular system bandwidth is serviced by dropping a specific band from the regular system bandwidth. Accordingly, there exists a need for adapting a communication technique used in a regular system bandwidth to an irregular system bandwidth configured by carrier aggregation or tone dropping.

DISCLOSURE OF INVENTION

Technical Problem

An object of the present invention devised to solve the problem lies on a method and apparatus for configuring a preamble in order to support an irregular system bandwidth.

Another object of the present invention devised to solve the problem lies on a method and apparatus for transmitting and receiving a preamble.

A further object of the present invention devised to solve the problem lies on a method and an apparatus for detecting a preamble.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

The object of the present invention can be achieved by providing a method for transmitting a preamble, in which the preamble is configured with a minimum number of preamble sequence subblocks that make a length of the preamble equal to or larger than an irregular system bandwidth. The preamble may be configured with remaining sequence subblocks after some of a plurality of sequence subblocks corresponding to a regular system bandwidth are dropped. The size of the remaining sequence subblocks is equal to or larger than the irregular system bandwidth. A maximum number of preamble sequence subblocks that make the difference between the length of the preamble and the irregular system bandwidth equal to or less than the size of one subband are dropped from the plurality of sequence subblocks.

A receiver for receiving a preamble signal may determine a minimum number of preamble sequence subblocks that make the length of the preamble equal to or larger than the irregular system bandwidth to be the preamble.

To achieve these objects and other advantages and in accordance with the purpose of the invention, as embodied and broadly described herein, a method for transmitting a Secondary Advanced (SA)-Preamble supporting an irregular system bandwidth at a base station in a wireless communication system is provided. The method comprises: transmitting a Primary Advanced (PA)-Preamble corresponding to an irregular system bandwidth to a user equipment; and transmitting an SA-Preamble corresponding to the irregular system bandwidth to the user equipment, wherein the SA-Preamble is configured by dropping a maximum number of pairs of SA-Preamble sequence subblocks that make a length of the SA-Preamble equal to or larger than the irregular system bandwidth, symmetrically with respect to a DC (direct current) component, from a plurality of SA-Preamble sequence subblocks corresponding to a regular system bandwidth.

In another aspect of the present invention, a base station for transmitting a Secondary Advanced (SA)-Preamble supporting an irregular system bandwidth in a wireless communication system is provided. The base station comprises: a transmitter for transmitting a signal to a user equipment; and a processor for controlling the transmitter to transmit a Primary Advanced (PA)-Preamble corresponding to an irregular system bandwidth to the user equipment and controlling the transmitter to transmit an SA-Preamble corresponding to the irregular system bandwidth to the user equipment, wherein the SA-Preamble is configured by dropping a maximum number of pairs of SA-Preamble sequence subblocks that make a length of the SA-Preamble equal to or larger than the irregular system bandwidth, symmetrically with respect to a DC (direct current) component, from a plurality of SA-Preamble sequence subblocks corresponding to a regular system bandwidth.

In still another aspect of the present invention, a method for receiving a Secondary Advanced (SA)-Preamble at a user equipment in a wireless communication system is provided. The method comprises: receiving a Primary Advanced (PA)-Preamble from a base station; determining a system bandwidth supported by the base station based on a sequence of the PA-Preamble; and receiving an SA-Preamble corresponding to the system bandwidth from the base station, wherein if the system bandwidth is an irregular system bandwidth, the SA-Preamble is configured by dropping a maximum number of pairs of SA-Preamble sequence subblocks that make a length of the SA-Preamble equal to or larger than the irregular system bandwidth, symmetrically with respect to a DC (direct current) component, from a plurality of SA-Preamble sequence subblocks corresponding to a regular system bandwidth.

In further still another aspect of the present invention, a user equipment for receiving a Secondary Advanced (SA)-Preamble in a wireless communication system is provided. The user equipment comprises: a receiver for receiving a Primary Advanced (PA)-Preamble from a base station; and a processor for determining a system bandwidth supported by the base station based on a sequence of the PA-Preamble and controlling the receiver to receive an SA-Preamble corresponding to the system bandwidth from the base station, wherein if the system bandwidth is an irregular system bandwidth, the SA-Preamble is configured by dropping a maximum number of pairs of SA-Preamble sequence subblocks that make a length of the SA-Preamble equal to or larger than the irregular system bandwidth, symmetrically with respect to a DC (direct current) component, from a plurality of SA-Preamble sequence subblocks corresponding to a regular system bandwidth.

In each aspect of the present invention, the irregular system bandwidth may be configured by dropping one or more pairs of subbands from the regular system bandwidth, symmetrically with respect to the DC component.

In each aspect of the present invention, if the irregular system bandwidth is 5 MHz to 10 MHz, the SA-Preamble may be configured based on a plurality of SA-Preamble sequence subblocks corresponding to a regular system bandwidth of 10 MHz, and if the irregular system bandwidth is 10 MHz to 20 MHz, the SA-Preamble may be configured based on a plurality of SA-Preamble sequence subblocks corresponding to a regular system bandwidth of 20 MHz.

In each aspect of the present invention, the user equipment acquires a cell Identifier (ID) of the base station based on the SA-Preamble.

The aforementioned technical solutions are only a part of the embodiments of the present invention, and various modifications to which technical features of the present invention are applied could be understood by the person with ordinary skill in the art to which the present invention pertains, based on the following detailed description of the present invention.

Advantageous Effects of Invention

According to embodiments of the present invention, a preamble designed for use in a regular system bandwidth can be used in an irregular system bandwidth with a minimized effect on the regular system bandwidth.

In addition, a UE can accurately detect a preamble transmitted in an irregular system bandwidth.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 illustrates the structures of SA-Preambles corresponding to system bandwidths, for 512-FFT and 1024-FFT;

MODE FOR THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system corresponding to an IEEE 802.16 system, the following description can be applied to other mobile communication systems except unique features of the IEEE 802.16 system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a terminal equipment denotes a mobile or fixed type user terminal. Examples of the terminal equipment include various equipments that transmit and receive user data and/or various kinds of control information to and from a base station. The terminal equipment may be referred to as a user equipment (UE), a mobile station (MS), a mobile terminal (MT), a user terminal (UT), a subscriber station (SS), a wireless device, a personal digital assistant (PDA), a wireless modem, or a handheld device. Also, in the present invention, a base station (BS) means a fixed station that performs communication with a UE and/or another BS, and exchanges various kinds of data and control information with the UE and another BS. The BS may be referred to another terminology such as an evolved-Node B (eNB), a Base Transceiver System (BTS), and an Access Point (AP).

Figure 2:
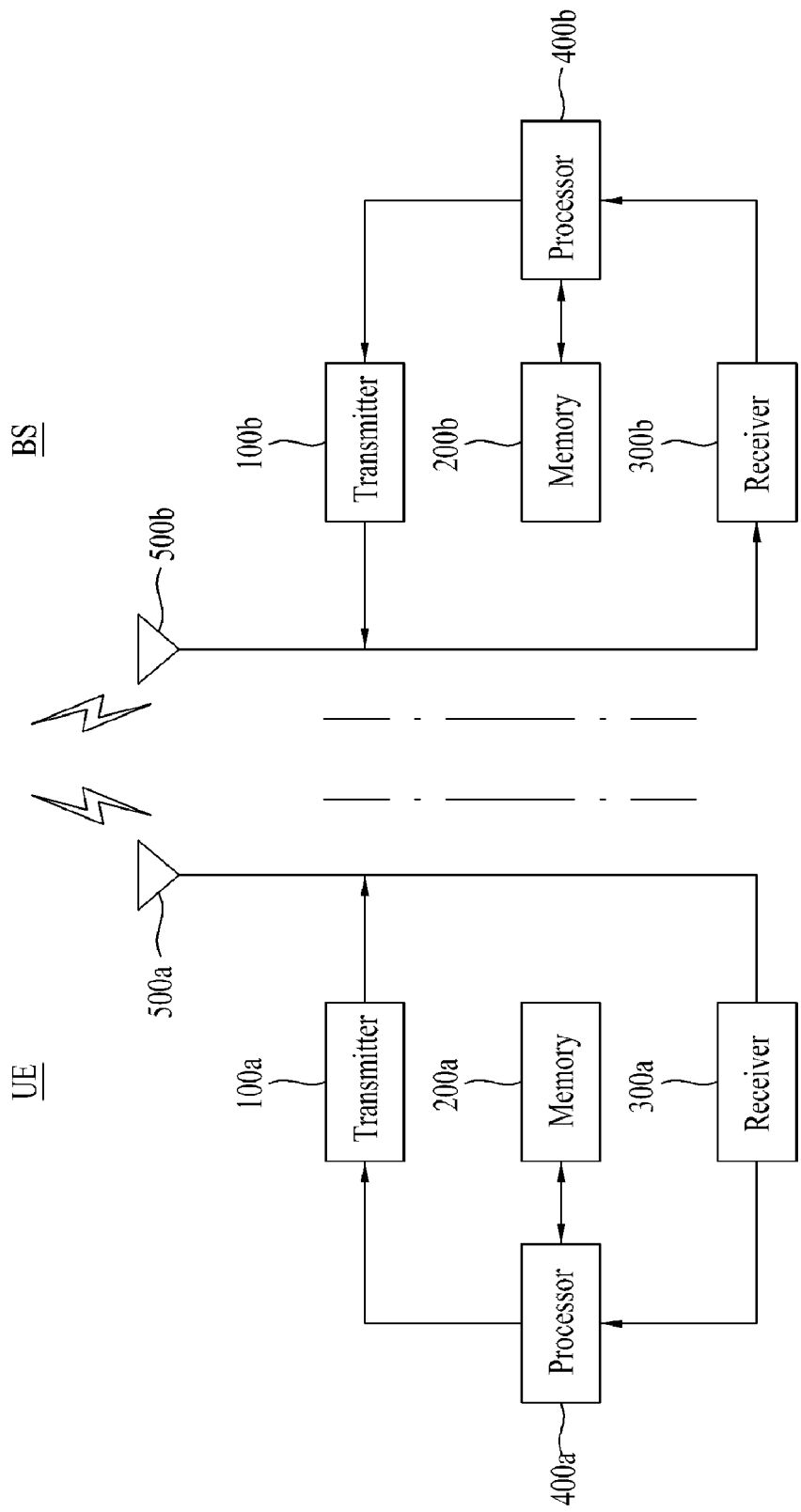
FIG. 2 is a block diagram illustrating a User Equipment (UE) and a Base Station (BS) for implementing the present invention.

FIG. 2 is a block diagram illustrating a UE and a BS for implementing the present invention.

The UE serves as a transmitting apparatus on the uplink and as a receiving apparatus on the downlink. By contrast, the BS may serve as a receiving apparatus on the uplink and as a transmitting apparatus on the downlink. The UE and the BS include antennas 500a and 500b for receiving information, data, signals, and/or messages, transmitters 100a and 100b for transmitting messages by controlling the antennas 500a and 500b, receivers 300a and 300b for receiving messages by controlling the antennas 500a and 500b, and memories 200a and 200b for storing information associated with communication in the wireless communication system. The UE and the BS further include processors 400a and 400b, respectively, which are adapted to perform the present invention by controlling the components of the UE and the BS, such as the transmitters 100a and 100b, the receivers 300a and 300b, and the memories 200a and 200b. The transmitter 100a, the memory 200a, the receiver 300a, and the processor 400a in the UE may be configured as independent components by separate chips or their separate chips may be incorporated into a single chip. Likewise, the transmitter 100b, the memory 200b, the receiver 300b, and the processor 400b in the BS may be configured as independent components on separate chips or their separate chips may be incorporated into a single chip. The transmitter and the receiver may be configured as a single transceiver in the UE or the BS.

The antennas 500a and 500b transmit signals generated from the transmitters 100a and 100b to the outside, or transfer radio signals received from the outside to the receivers 300a and 300b. If the transmitters 100a and 100b and/or the receivers 300a and 300b support a Multiple Input Multiple Output (MIMO) function using a plurality of antennas, each of them may be connected to two or more antennas.

The processors 400a and 400b generally provide overall control to the modules of the UE and the BS. Especially, the processors 400a and 400b may carry out a control function for performing the present invention, a Medium Access Control (MAC) frame conversion control function based on service characteristics and a propagation environment, a power saving mode function for controlling idle-mode operations, a handover function, and an authentication and encryption function. The processors 400a and 400b may also be referred to as controllers, microcontrollers, microprocessors, microcomputers, etc. The processors 400a and 400b may be achieved by hardware, firmware, software, or their combination. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), and/or Field Programmable Gate Arrays (FPGAs), for implementing the present invention. In a firmware or software configuration, firmware or software may be configured to include a module, a procedure, a function, etc. for performing functions or operations of the present invention. This firmware or software may be provided in the processors 400a and 400b, or may be stored in the memories 200a and 200b and driven by the processors 400a and 400b.

The transmitters 100a and 100b perform predetermined coding and modulation for signals and/or data, which are scheduled by schedulers connected with the processors 400a and 400b and transmitted to the outside, and then transfer the modulated signals and/or data to the antennas 500a and 500b. For example, the transmitters 100a and 100b convert a transmission data stream to K signal streams by demultiplexing, channel coding, modulation, etc. The K signal streams are transmitted through the antennas 500a and 500b after being processed in transmission processors of the transmitters 100a and 100b. The transmitters 100a and 100b and the receivers 300a and 300b of the UE and the BS may be configured in different manners depending on the procedures of processing transmitted signals and received signals.

Figure 3:
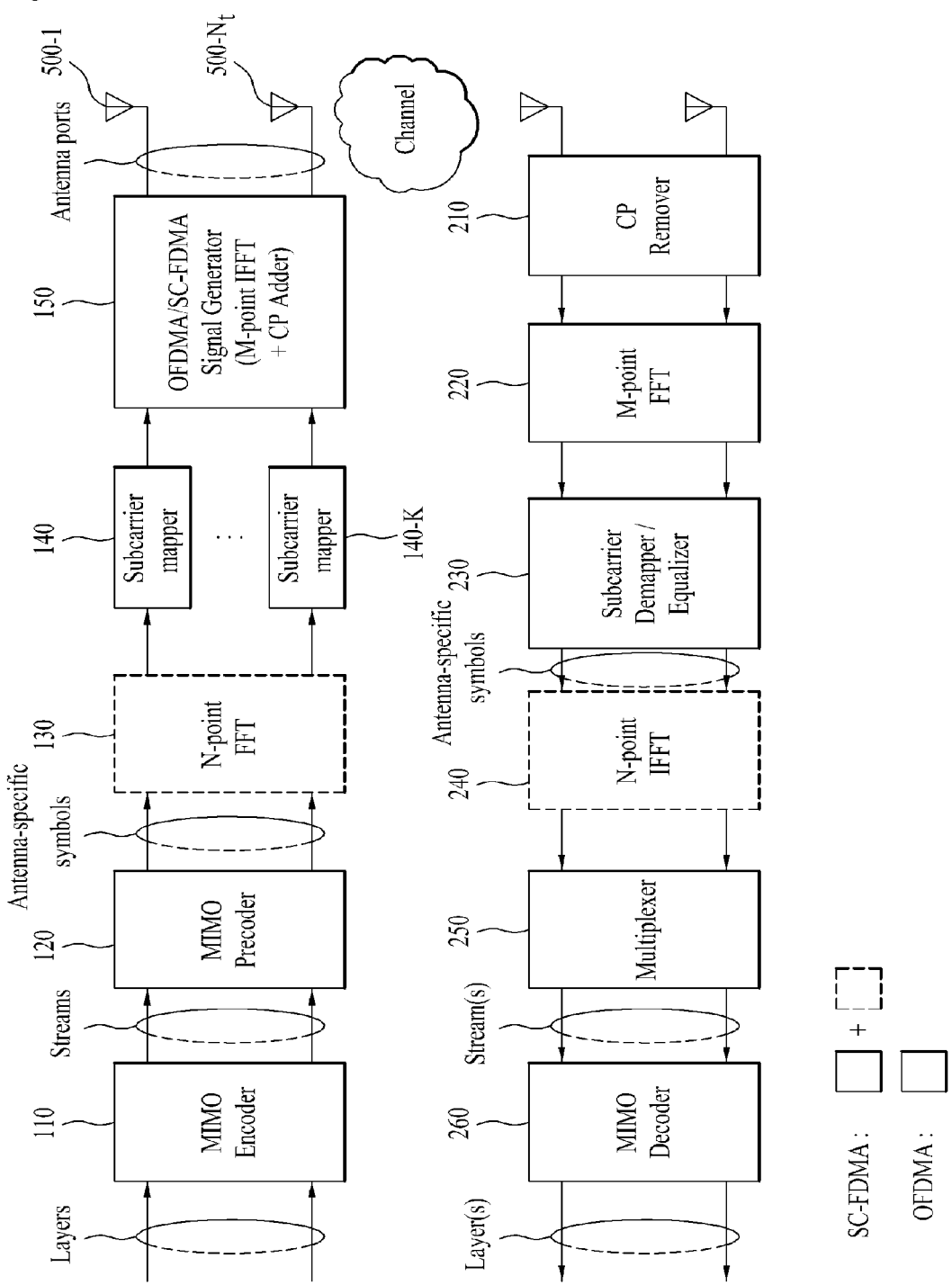
FIG. 3 is a block diagram illustrating an example of a transmitter in each of the UE and the BS.

FIG. 3 is a block diagram illustrating an example of a transmitter in each of the UE and the BS. Operations of the transmitters 100a and 100b will be described below in more detail with reference to FIG. 3.

Referring to FIG. 3, each of the transmitters 100a and 100b includes a MIMO encoder 110, a MIMO precoder 120, subcarrier mappers 140-1 to 140-K, Orthogonal Frequency Division Multiplexing (OFDM) signal generators. Each of the transmitter 100a and 100b is connected to $N_t$ transmission antennas 500-1 to 500-$N_t$.

The MIMO encoder 110 encodes a transmission data stream in accordance with a predetermined coding scheme to form coded data and modulates the coded data to be arranged as symbols representing positions on a signal constellation in a predetermined modulation scheme. The transmission data stream input to the MIMO encoder 110 may be generated by subjecting a data block received from a MAC layer to various signal processes such as channel encoding, interleaving, and scrambling. The data stream may be referred to as a codeword or a layer and is equivalent to a data block from the MAC layer. The data block from the MAC layer is referred to as a transport block. The modulation scheme may be, but not limited to, any of m-Phase Shift Keying (m-PKS) and m-Quadrature Amplitude Modulation (m-QAM). For modulating the coded data, the MIMO encoder 110 may have an independent modulation module. In the mean time, the MIMO encoder 110 may define MIMO streams of the input symbols such that the MIMO precoder 120 can distribute antenna-specific symbols to corresponding antenna paths. A MIMO stream refers to an information path input to the MIMO precoder 120, and the information path before the MIMO precoder 120 may be referred to as a virtual antenna or a MIMO stream. To define the MIMO streams of the symbols, the MIMO encoder 110 may be provided with a MIMO stream mapper configured as an independent module.

The MIMO precoder 120 outputs antenna-specific symbols to the subcarrier mappers 140-1 to 140-K by processing the received symbols in accordance with to a MIMO scheme according to the multiple transmission antennas 500-1 to 500-$N_t$. Mapping of the MIMO streams to the antennas 500-1 to 500-$N_t$ is performed by the MIMO precoder 120. Specifically, the MIMO precoder 120 multiplies the output x of the encoder 11 by an $N_t \times M_t$ precoding matrix W. The output of the MIMO precoder 120 may be represented as an $N_t \times N_F$ matrix z.

The subcarrier mappers 140-1 to 140-K allocate the antenna-specific symbols to appropriate subcarriers and multiplex them according to users. The OFDM signal generators 150 output OFDM symbols by modulating the antenna-specific symbols according to OFDM modulation scheme. For example, the OFDM signal generators 150 may perform Inverse Fast Fourier Transform (IFFT) for the antenna-specific symbols and insert a Cyclic Prefix (CP) into the resulting IFFT time-domain symbol. After digital-to-analog conversion and frequency upconversion, the OFDMA symbol is transmitted to the receiving apparatus through the transmission antennas 500-1 to 500-$N_t$. The OFDMA signal generator 150 may include an IFFT module, a CP inserter, a Digital-to-Analog Converter (DAC), and a frequency upconverter.

The OFDMA receivers 300a and 300b process signals in reverse to the operation of the OFDMA transmitters.

More specifically, the receivers 300a and 300b decode and demodulate radio signals received through the antennas 500a and 500b from the outside and transfer the demodulated signals to the processors 400a and 400b. The antenna 500a or 500b connected to each of the receivers 300a and 300b may include N reception antennas. Signals received through the respective reception antennas are downconverted to baseband signals and recovered to an original data stream intended by the transmitter 100a or 100b, after multiplexing and channel demodulation. Therefore, each of the receivers 300a and 300b may have a signal recoverer for downconverting received signals to baseband signals, a multiplexer for multiplexing the baseband signals, and a channel demodulator for demodulating the multiplexed signal stream to a data stream. The signal recoverer, the multiplexer, and the channel demodulator may be configured as separate modules or incorporated into a single module. More specifically, the signal recoverer may include an Analog-to-Digital Converter (ADC) for converting an analog signal to a digital signal, a CP remover 210 for removing a CP from the digital signal, a Fast Fourier Transform (FFT) module 220 for generating frequency symbols by applying FFT to the CP-removed signal, and a subcarrier demapper/equalizer 230 for recovering the frequency symbols to antenna-specific symbols. A multiplexer 250 recovers MIMO streams from the antenna-specific symbols and a MIMO decoder 260 recovers the data streams transmitted by the transmitting apparatus from the MIMO streams.

Compared to the OFDMA transmitter, an SC-FDMA transmitter further includes an FFT module 130 before the subcarrier mappers 140 to 140-K. The SC-FDMA transmitter may significantly reduce Peak-to-Average Power Ratio (PAPR) by spreading a plurality of data in the frequency domain through FFT before IFFT is performed, relative to the OFDMA scheme. An SC-FDMA receiver further includes an IFFT module 240 after the subcarrier demapper/equalizer 230 in addition to the components of the OFDMA receiver. The SC-FDMA receiver processes a signal in reverse to the operation of the SC-FDMA transmitter.

Although it has been described in FIG. 2 and FIG. 3 that each of the transmitters 110a and 100b includes the MIMO encoder 110, the MIMO precoder 120, the subcarrier mappers 140-1 to 140-K, and the OFDMA/SC-FDMA signal generators 150, the processors 400a and 400b of the transmitting apparatus may include the MIMO encoder 110, the MIMO precoder 120, the subcarrier mappers 140-1 to 140-K, and the OFDMA/SC-FDMA signal generators 150. Likewise, although it has been described in FIG. 2 and FIG. 3 that each of the receivers 300a and 300b includes the signal recoverer, the multiplexer, and the channel demodulator, the processors 400a and 400b of the receiving apparatus may include the signal recoverer, the multiplexer, and the channel demodulator. Hereinafter, for convenience of description, the MIMO encoder 110, the MIMO precoder 120, the subcarrier mappers 140-1 to 140-K, and the OFDMA/SC-FDMA signal generators 150 are included in the transmitters 100a and 100b separated from the processors 400a and 400b that control the operations of the MIMO encoder 110, the MIMO precoder 120, the subcarrier mappers 140-1 to 140-K, and the OFDMA/SC-FDMA signal generators 150. And, the signal recoverer, the multiplexer, and the channel demodulator are included in the receivers 300a and 300b separated from the processors 400a and 400b that control the operations of the signal recoverer, the multiplexer, and the channel demodulator. However, the embodiments of the present invention can equally be applied to the case where the MIMO encoder 110, the MIMO precoder 120, the subcarrier mappers 140-1 to 140-K, and the OFDMA/SC-FDMA signal generators 150 are included in the processors 400a and 400b and the case where the signal recoverer, the multiplexer, and the channel demodulator are included in the processors 400a and 400b.

The memories 200a and 200b may store programs required for signal processing and controlling of the processors 400a and 400b and temporarily store input and output information. Each of the memories 200a and 200b may be implemented into a flash memory-type storage medium, a hard disc-type storage medium, a multimedia card micro-type storage medium, a card-type memory (e.g. a Secure Digital (SD) or eXtreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

The processor 400b of the BS according to the present invention configures an irregular system bandwidth from a regular system bandwidth and configures an SA-Preamble corresponding to the irregular system bandwidth from an SA-Preamble corresponding to the regular system bandwidth according to later-described embodiments of the present invention.

The processor 400a of the UE according to the present invention may control the receiver 300a to receive an SA-Preamble configured according to the embodiments of the present invention. The receiver 300a may include a filter adapted to receive the SA-Preamble corresponding to the irregular system bandwidth. The filter is configured so as to pass the frequency band of the SA-Preamble corresponding to the irregular system bandwidth. The processor 400a may identify a system bandwidth provided by the BS from a PA-Preamble and control the pass band of the filter based on the system bandwidth. If the system bandwidth is an irregular system bandwidth, the processor 400a may adjust the pass band of the filter such that the filter can pass the transmission band of an SA-Preamble configured according to the later-described embodiments of the present invention. The processor 400a may acquire the cell ID of the BS using an SA-Preamble sequence that is formed with SA-Preamble sequence blocks passed through the filter.

Figure 4:
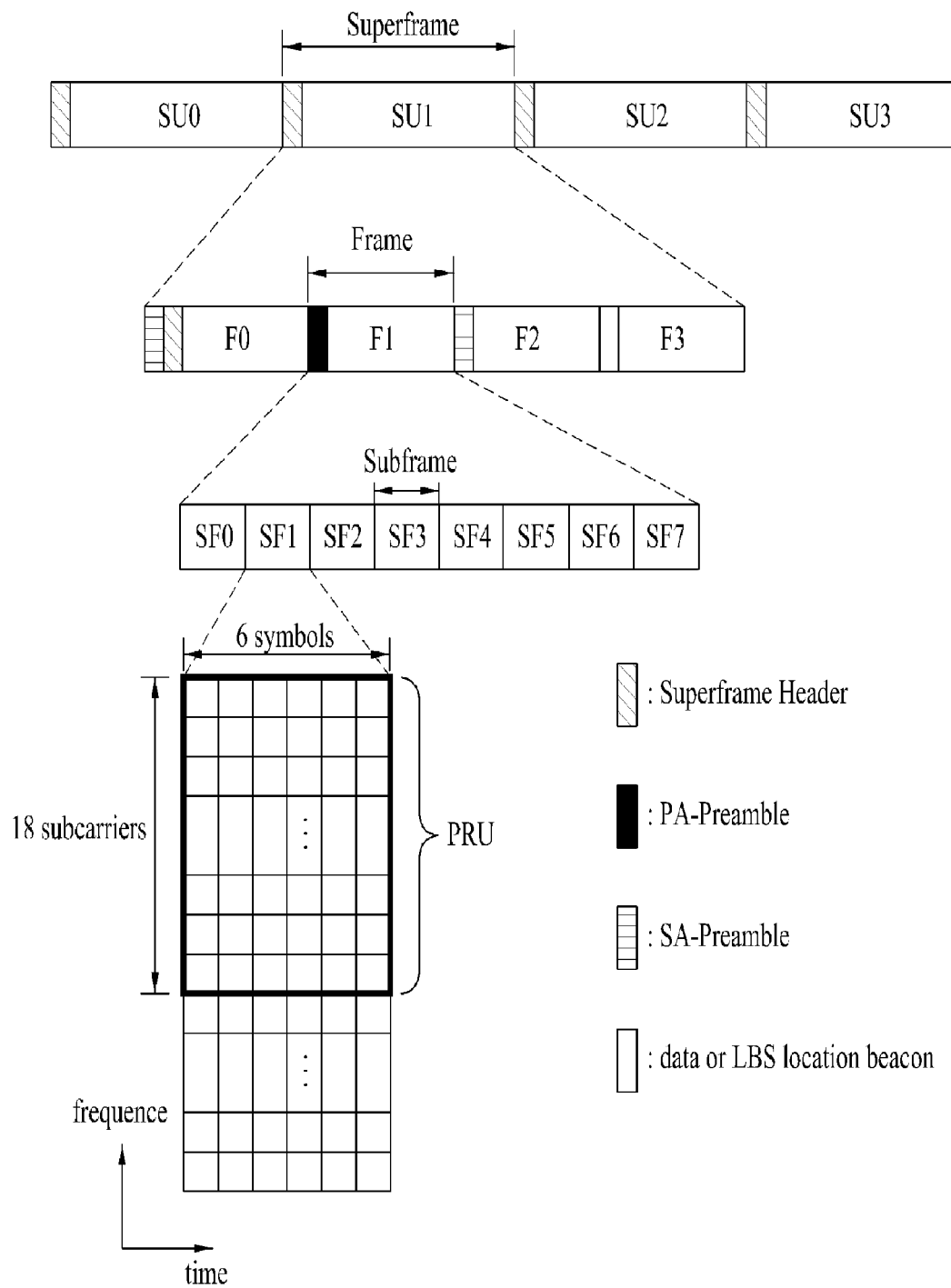
FIG. 4 illustrates an example of a structure of a radio frame used in the wireless communication system.

FIG. 4 illustrates an example of a structure of a radio frame used in the wireless communication system. Especially, FIG. 4 illustrates a structure of a radio frame of the IEEE 802.16 system. The radio frame structure can be applied to a Frequency Division Duplex (FDD) mode, a Half Frequency Division Duplex (H-FDD) mode, and a Time Division Duplex (TDD) mode.

Referring to FIG. 4, the radio frame includes superframes SU0 to SU3 of 20 ms that support a bandwidth of 5 MHz, 8.75 MHz, 10 MHz or 20 MHz. Each superframe includes four frames F0 to F3 of 5 ms having the same size, and starts with a SuperFrame Header (SFH). The SFH carries essential system parameters and system configuration information. The SFH can be located within the first subframe of the superframe. The SFH can be classified into a Primary SFH (P-SFH) and a Secondary SFH (S-SFH). The P-SFH is transmitted per superframe. The S-SFH may be transmitted per superframe. The SFH can include a broadcast channel.

One frame can include eight subframes SF0 to SF7. The subframe is allocated for downlink or uplink transmission. The frame can be configured differently depending on duplex modes. For example, since downlink transmission and uplink transmission are identified by frequency in the FDD mode, one frame includes either downlink subframes or uplink subframes. In the FDD mode, an idle time can exist at the end of each frame. On the other hand, since downlink transmission and uplink transmission are identified by time in the TDD mode, subframes within the frame are classified into a downlink subframe and an uplink subframe. In the TDD mode, an idle time referred to as a Transmit/receive Transition Gap (TTG) exists while the downlink is being changed to the uplink. Also, idle time referred to as a Receive/transmit Transition Gap (RTG) exists while the uplink is being changed to the downlink.

The subframe is a unit of a Transmission Time Interval (TTI). In other words, one TTI is defined by one or more subframes. In general, basic TTI is set to one subframe. The TTI means a time interval that a physical layer transmits coded packets through a radio interface. Accordingly, one subframe or a plurality of neighboring subframes can be used for transmission of data packets.

The subframe includes a plurality of OFDMA symbols in a time domain and a plurality of subcarriers in a frequency domain. The OFDMA symbols may be referred to as OFDMA symbols or SC-FDMA symbols depending on a multiplexing access mode. The number of OFDMA symbols included in one subframe can be varied depending on channel bandwidth and CP length. A type of the subframe can be defined depending on the number of OFDMA symbols included in the subframe. For example, the type of the subframe can be defined in such a manner that subframe type-1 includes six OFDMA symbols, subframe type-2 includes seven OFDMA symbols, subframe type-3 includes five OFDMA symbols, and subframe type-4 includes nine OFDMA symbols. One frame may include one type of subframes or different types of subframes. For convenience of description, the subframe type-1 that includes six OFDMA symbols is described in the embodiments of the present invention. However, the embodiments of the present invention, which will be described later, can be applied to the other types of subframes in the same manner.

In the frequency domain, the OFDMA symbol includes a plurality of subcarriers, and the number of subcarriers is determined depending on the size of FFT. The subcarriers can be classified into data subcarriers for data transmission, pilot subcarriers for channel measurement, and null subcarriers for guard band and DC components. Examples of parameters for the OFDMA symbols include BW, Nused, n, G, etc. The BW is a nominal channel bandwidth. Nused is the number of subcarriers used for signal transmission. Also, n is a sampling factor, and determines subcarrier spacing and useful symbol time together with BW and Nused. G is a ratio between CP time and useful time.

In the frequency domain, resources can be grouped in a predetermined number of subcarriers. A group comprised of a predetermined number of subcarriers within one subframe is referred to as a Physical Resource Unit (PRU). The subframe includes a plurality of PRUs in the frequency domain. The PRU is a basic unit for resource allocation, and includes a plurality of continuous OFDMA symbols in the time domain and a plurality of continuous subcarriers in the frequency domain. For example, the number of OFDMA symbols within the PRU may be the same as the number of OFDMA symbols included in the subframe. Accordingly, the number of OFDMA symbols within the PRU can be determined depending on the type of the subframe. In the mean time, the number of subcarriers within the PRU may be 18. In this case, the PRU includes 6 OFDM symbols×18 subcarriers. The PRU can be denoted as a Distributed Resource Unit (DRU) or a Contiguous Resource Unit (CRU) depending on a resource allocation type. A basic permutation unit of a downlink DRU is a tone-pair that includes two subcarriers and one symbol. In case of the subframe type-1, one PRU includes 108 tones. A tone can be also referred to as a resource element.

The subframe can be divided into at least one Frequency Partition (FP) in the frequency domain. The FP can be used for Fractional Frequency Reuse (FFR). Each FP includes one or more PRUs. Distributed resource allocation and/or contiguous resource allocation can be applied to each FP. A Logical Resource Unit (LRU) is a basic logical unit for distributed resource allocation and contiguous resource allocation.

The aforementioned structure is only exemplary. Accordingly, various modifications can be made in the length of the superframe, the number of subframes included in the superframe, the number of OFDMA symbols included in the subframe, and parameters of OFDMA symbols. For example, the number of subframes included in the frame can be varied depending on the channel bandwidth and the CP length.

In the mean time, the current IEEE 802.16m standard regulates a maximum of four synchronization signals to be transmitted in one superframe. For example, in the IEEE 802.16m system, a downlink synchronization signal includes a primary synchronization signal and a secondary synchronization signal, wherein the primary synchronization signal includes a PA-Preamble and the secondary synchronization signal includes an SA-Preamble. In the FDD mode and the TDD mode, each of the PA-Preamble, the SA-Preamble and a Location Based Service (LBS) location beacon is located at the first symbol of each frame. In more detail, the PA-Preamble is located at the first symbol of the second frame F1 within the superframe, and the SA-Preamble is located at the first symbol of the first and third frames F0 and F2 within the superframe. The first symbol of the last frame F4 within the superframe contains the LBS location beacon at the first symbol of the last frame F4 within the superframe if the superframe is for location measurement for LBS, or contains a data signal. The PA-Preamble carries system bandwidth and carrier configuration information. Accordingly, the UE can acquire system bandwidth and carrier configuration information from the PA-Preamble. Hereinafter, a symbol to/on which the PA-Preamble is allocated/transmitted will be referred to as a PA-Preamble symbol.

The SA-Preamble carries the cell ID of the BS. The SA-Preamble is respectively transmitted on the first symbols within the first and third frames during one superframe. The UE may detect the cell ID of the corresponding BS or performs cell scanning during handover by accumulating the SA-Preamble transmitted three times within one superframe.

Figure 5:
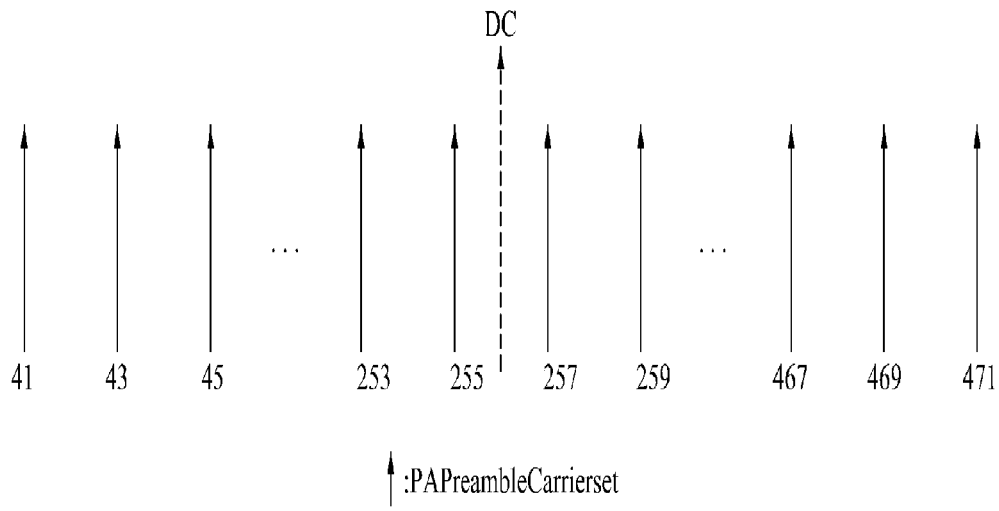
FIG. 5 illustrates subcarriers into which a Primary Advanced (PA)-Preamble is mapped.

FIG. 5 illustrates subcarriers into which a PA-Preamble is mapped.

Referring to FIG. 5, the PA-Preamble has a length of 216 irrespective of FFT size.

The PA-Preamble can carry information such as system bandwidth information and carrier configuration information. For example, the PA-Preamble can be inserted into subcarriers of 41, 43, . . . , 469. The PA-Preamble can carry information such as system bandwidth information and carrier configuration information. If subcarrier index of 256 is reserved to DC, subcarrier into which sequence is mapped can be determined using the following Math Figure.

MathFigure 1

$$PAPreambleCarrierSet = 2 \cdot k + 41 \quad \text{[Math.1]}$$

Figure 1:
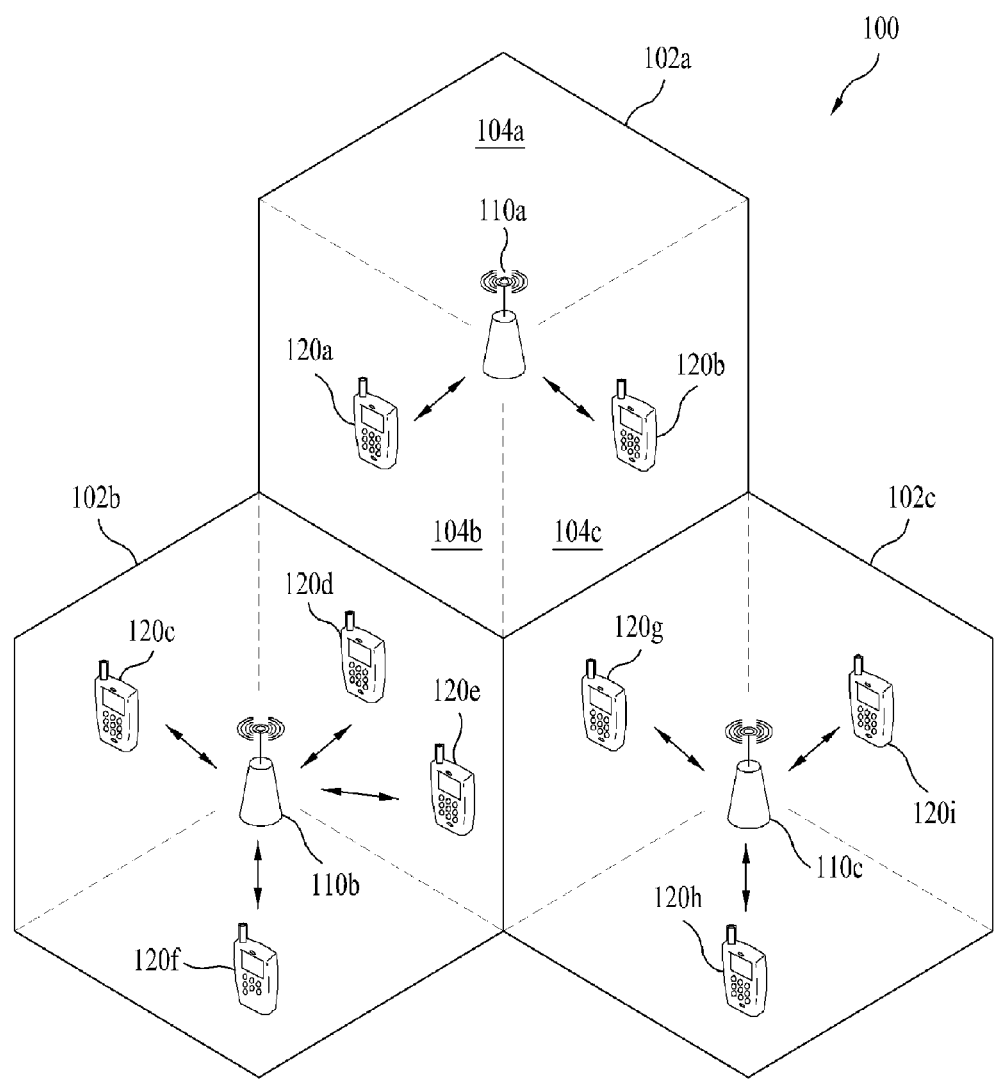
FIG. 1 is a diagram illustrating a wireless communication system.

In Math Figure 1, PAPreambleCarrierSet specifies all subcarriers allocated to the PA-Preamble, and k is a running index 0 to 215.

For example, PA-Preamble sequences for 5 MHz, 10 MHz, 20 MHz can be defined in a hexadecimal format as following Table 1. The defined series is mapped onto subcarriers in ascending order.

TABLE 1

| | PA-Preamble series | | |
|---|---|---|---|
| Index | Carrier | BW | Series to modulate |
| 0 | Fully Configured | 5 MHz | 6DB4F3B16BCE59166C9CEF7C3C8CA5E DFC16A9D1DC01F2AE6AA08F |
| 1 | | 10 MHz | 1799628F3B9F8F3B22C1BA19EAF94FEC 4D37DEE97E027750D298AC |
| 2 | | 20 MHz | 92161C7C19BB2FC0ADE5CEF3543AC1B 6CE6BE1C8DCABDDD319EAF7 |
| ... | ... | ... | ... |

The sequences of indices from 3 in Table 1 are reserved for irregular channel bandwidths.

An irregular channel bandwidth may be created by dropping a specific band from a regular system bandwidth. This is called tone dropping. In the IEEE 802.16m system, for instance, 5 MHz, 10 MHz and 20 MHz are defined as regular system bandwidths. A communication service provider may service an irregular system bandwidth between 5 MHz and 20 MHz through tone dropping. An irregular system bandwidth created by applying tone dropping to a regular system bandwidth is called a Tone-Dropped BandWidth (TD-BW).

Bandwidth information provided by the communication service provider may be transmitted in the afore-mentioned PA-Preamble sequence to UEs. It may be contemplated that indexes equal to or larger than 3 in Table 1 are mapped to irregular system bandwidths and a specific PA-Preamble sequence among sequences corresponding to indexes equal to or larger than 3 indicates a specific irregular system bandwidth.

Figure 6:
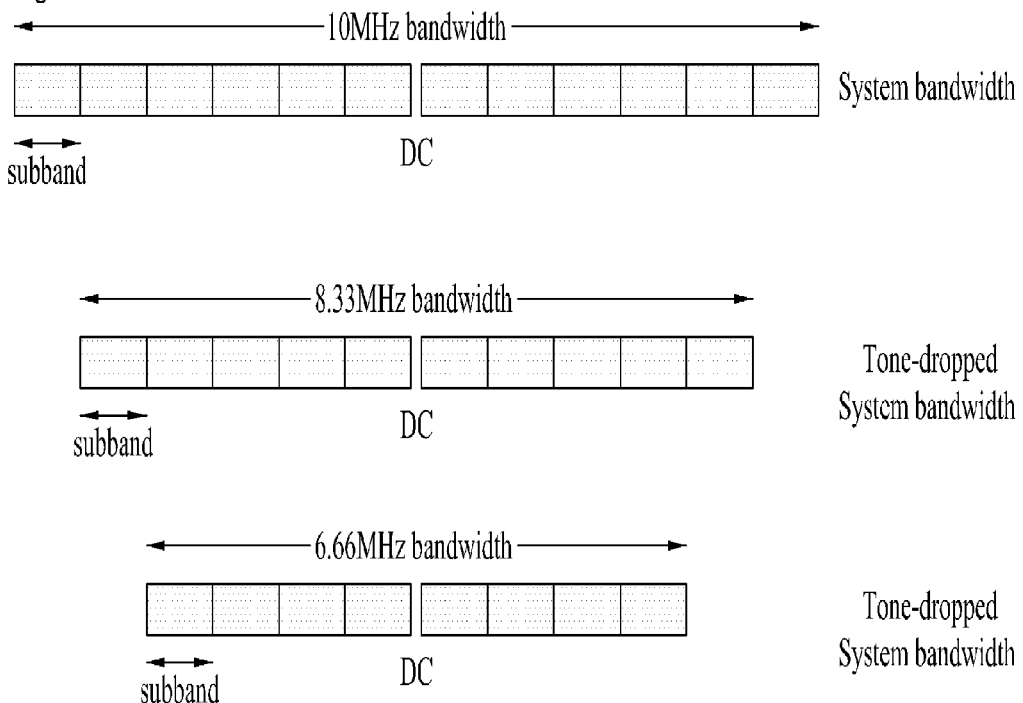
FIG. 6 illustrates an example of generating an irregular system bandwidth through tone dropping.

FIG. 6 illustrates an example of generating an irregular system bandwidth through tone dropping.

Each of 5 MHz, 10 MHz and 20 MHz is partitioned into subbands each including 4 PRUs. That is, each band is partitioned into units of 72 subcarriers. A subband is a basic permutation unit. Accordingly, an irregular system bandwidth between 5 MHz and 10 MHz may be created by dropping specific subband(s) from 10 MHz.

For instance, a bandwidth of 8.33 MHz may be obtained by dropping two subbands of the 10-MHz system bandwidth—one subband at each end of the 10-MHz system bandwidth respect to a DC component. A bandwidth of 6.33 MHz may be obtained by dropping two subbands at each end of the 10-MHz system bandwidth with respect to the DC component.

An irregular system bandwidth between 10 MHz and 20 MHz may be created by dropping a subband (subbands) at the left and/or right end of the 20-MHz system band with respect to the DC component.

Figure 7:
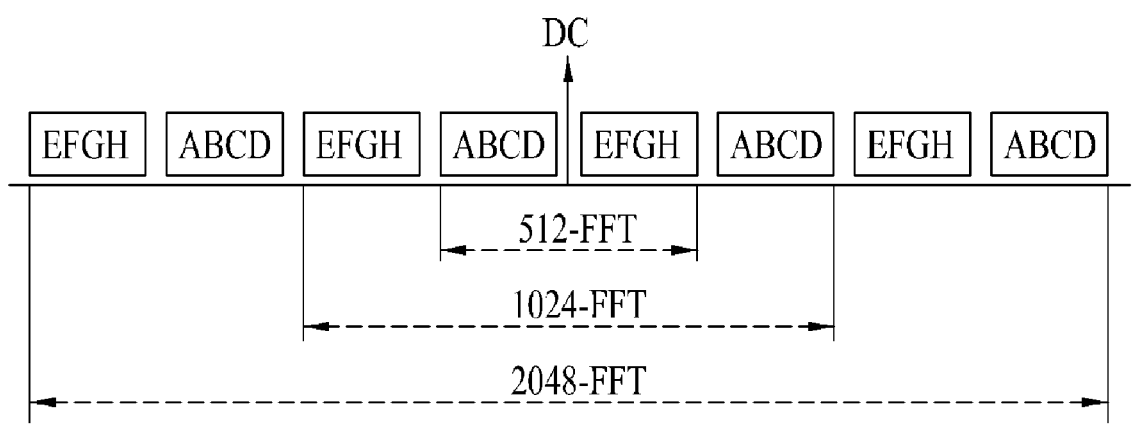
FIG. 7 illustrates an example of subcarriers into which a Secondary Advanced (SA)-Preamble is mapped.

FIG. 7 illustrates an example of subcarriers into which SA-Preamble is mapped.

Referring to FIG. 7, the number of subcarriers allocated to an SA-Preamble can be varied depending on the size of FFT (Fast Fourier Transform). For example, the SA-Preamble may have 144, 288 and 576 lengths for 512-FFT, 1024-FFT, and 2048-FFT. In the case where an M-point IFFT module of an FDMA/SC-FDMA transmitter performs 512-IFFT, up to 144 subcarriers may be allocated to an SA-Preamble. In the case of 1024-IFFT, up to 288 subcarriers may be allocated to an SA-Preamble. In the case of 2048-IFFT, up to 576 subcarriers may be allocated to an SA-Preamble.

If the subcarriers of 256, 512, and 1024 are respectively reserved to DC component for 512-FFT, 1024-FFT and 2048-FFT, the subcarriers allocated to the SA-Preamble can be determined depending on the following Math Figure.

MathFIG. 2

$$SA\ PreambleCarrierSet_n = n + 3 \cdot k + 40 \cdot \frac{N_{SAP}}{144} + \text{floor}\left(\frac{2 \cdot k}{N_{SAP}}\right) \quad [\text{Math. 2}]$$

where SAPreambleCarrierSet$_n$ specifies all subcarriers allocated to the specific SA-Preamble. In Math Figure 2, n is a carrier set index indicating segment ID. Segment 0 uses carrier set 0, segment 1 uses carrier set 1, and segment 2 uses carrier set 2. $N_{SAP}$ denotes the number of subcarriers allocated for SA-Preamble, and has values of 144, 288 and 576 for 512-FFT, 1024-FFT and 2048-FFT. Also, k is a running index 0 to $N_{SAP}-1$ for each FFT size.

Each cell has a cell ID (IDCell) represented by an integer between 0 and 767. Cell ID is defined by segment index and index given per segment. Generally, cell ID can be determined by the following Math Figure.

MathFigure 3

$$IDcell = 256n + Idx \quad [\text{Math.3}]$$

In Math Figure 3, n is the index of the SA-Preamble carrier-set 0, 1 and 2 representing segment ID. Index can be defined the following Math Figure.

MathFIG. 4

$$Idx = 2 \cdot \text{mod}(q, 128) + \text{floor}\left(\frac{q}{128}\right) \quad [\text{Math. 4}]$$

In Math Figure 4, q is a running index 0 to 255. For example, a sequence of subblocks corresponding to a specific sequence index q of specific segment ID can be identified from the sequences of Table 2 to Table 4.

In case of 512-FFT, the SA-Preamble of 288 bits is divided into eight sequence subblocks A, B, C, D, E, F, and H each having a length of 36 bits, and then can be mapped into subcarriers. Each sequence subblock consists of 3 PRUs. In other words, each sequence subblock includes 54 subcarriers. Also, after A, B, C, D, E, F, and H are sequentially modulated, they are mapped into the SA-Preamble subcarrier set corresponding to segment ID. In case of FFT greater than 512-FFT, basic subblocks A, B, C, D, E, F, and H are repeated in the same order and then mapped into the SA-Preamble subcarrier set. For example, in case of 1024-FFT, E, F, G, H, A, B, C, D, E, F, G, H, A, B, C, and D are modulated and then sequentially mapped into the SA-Preamble subcarrier set.

Each segment ID has different sequence sub-blocks. Table 2 to Table 4 depict the 8 sub-blocks of each segment ID where the sequence {+1, +j, −1, −j} for each sub-block for each segment is represented by QPSK manner.

TABLE 2 n = 0 (segment0)

| q | A | B | C | D | E | F | G | H |
|---|---|---|---|---|---|---|---|---|
| 0 | 314C8648F | 18BC23543 | 06361E654 | 27C552A2D | 3A7C69A77 | 011B29374 | 277D31A46 | 14B032757 |
| 1 | 281E84559 | 1A0CDDF7E | 2473A5D5B | 2C6439AB8 | 1CA9304C1 | 0AC3BECD0 | 34122C7F5 | 25362F596 |
| 2 | 00538AC77 | 38F9CBBC6 | 04DBCCB40 | 33CDC6E42 | 181114BE4 | 0766079FA | 2DD2F5450 | 13E0508B2 |
| 3 | 3BE4056D1 | 2C7953467 | 0E5F0DE66 | 03C9B2E7D | 1857FD2E3 | 15A276D4F | 210F282AF | 27CE61310 |
| 4 | 3DBAAE31E | 254AE8A85 | 168B63A64 | 05FDF74FB | 3948B6856 | 33656C528 | 1799C9BA1 | 004E0B673 |
| 5 | 177CE8FBC | 21CEE7F09 | 397CD6551 | 01D4A1A10 | 1730F9049 | 067D89EA9 | 3AC141077 | 3D7AD6888 |
| 6 | 3B78215A1 | 17F921D66 | 385006FDC | 011432C9D | 24ED16EA6 | 0A54922F1 | 02067E65D | 0FEC2128D |
| 7 | 01FF4E172 | 2A704C742 | 3A58705E1 | 3F3F66CD2 | 07CA4C462 | 1854C8AA3 | 03F576092 | 06A989824 |
| 8 | 1A5B7278E | 1630D0D82 | 3001EF613 | 34CCF51A1 | 2120C250A | 06893FA2D | 156073692 | 07178CFA7 |
| ... | ... | ... | ... | ... | ... | ... | ... | ... |
| 127 | 1EF89091A | 11A653D2C | 223FC1F42 | 2F7B97B31 | 2CA4EE011 | 00F68767D | 10FE34682 | 018339212 |

TABLE 3 n = 1 (segment1)

| q | A | B | C | D | E | F | G | H |
|---|---|---|---|---|---|---|---|---|
| 0 | 20A601017 | 10D0A84DE | 0A8C74995 | 07B9C4C42 | 23DB99BF9 | 12114A3F5 | 25341EDB0 | 362D37C00 |
| 1 | 1364F32EC | 0C4648173 | 08C12DA0C | 19BD8D33A | 3F5F0DDA6 | 24F99C596 | 026976120 | 3B40418C7 |
| 2 | 1C6548078 | 0A0D98F3C | 0AC496588 | 38CBF2572 | 22D7DA300 | 1CCEAF135 | 356CA0CCF | 093983370 |
| 3 | 03A8E3621 | 2D2042AF5 | 2AB5CC93B | 05A0B2E2E | 0B603C09E | 117AC5C94 | 2D9DEA5A0 | 0BDFF0D89 |
| 4 | 07C4F8A63 | 3E6F78118 | 32CCD25F2 | 1792A7B61 | 0A8659788 | 1F9708C04 | 086AF6E64 | 040B9CD78 |
| 5 | 2D7EE485A | 2C3347A25 | 3B98E86AF | 242706DC3 | 1CEF639AF | 2E1B0D6A9 | 3E9F78BC1 | 0FB31275F |
| 6 | 0307936D0 | 21CE15F03 | 392655B2D | 17BE2DE53 | 3718F9AB8 | 01A986D24 | 077BDA4EB | 1D670A3A6 |
| 7 | 05A10F7B7 | 31900ACE0 | 28DCA8010 | 2D927ABE5 | 370B33E05 | 31E57BCBE | 030DC5FE1 | 093FDB77B |
| 8 | 092C4FED1 | 268BF6E42 | 24576811F | 09F2DAA7F | 24EFFC8B1 | 21C205A90 | 1E7A58A84 | 048C453EB |
| ... | ... | ... | ... | ... | ... | ... | ... | ... |
| 127 | 34F9ACB6B | 384870FF1 | 257A863DE | 34B36BA0F | 3FA3D216B | 27425041B | 0E0DD0BAD | 2E95AD35D |

TABLE 4 n = 2 (segment2)

| | blk | | | | | | | |
|---|---|---|---|---|---|---|---|---|
| q | A | B | C | D | E | F | G | H |
| 0 | 13F99E8EC | 3CF776C2A | 3300A482C | 0B2BF4791 | 17BECDFE8 | 35998C6D4 | 05F8CB75C | 259B90F0B |
| 1 | 116913829 | 05188F2A4 | 2DB0A8D00 | 2F770FE4A | 185BE5E33 | 0F039A076 | 212F3F82C | 116635F29 |
| 2 | 004EE1EC6 | 18EF4FDD9 | 26C80900E | 1A63FB8A7 | 1DAA917D4 | 0E6716114 | 02690646D | 0CC94AD36 |
| 3 | 06D4FF377 | 2716E8A54 | 16A1720C8 | 08750246F | 393045CCB | 1DBCCDE43 | 114A0CAD6 | 181690377 |
| 4 | 3DC4EF347 | 1F53452FC | 01584B5D3 | 11D96034F | 1FA62568E | 11974FACA | 191BE154D | 397C9D440 |
| 5 | 05A1B6650 | 29835ADAD | 2F6DDABE4 | 0976A607B | 11BA92926 | 2456B1943 | 3E3FD608B | 095E7584B |
| 6 | 00CC66282 | 0560BE767 | 21EBAA7C6 | 2D8E9ACE3 | 198A9E285 | 05F3E73DD | 13DA751A2 | 176B75E43 |
| 7 | 03D08ADC1 | 2254606FC | 3C695D892 | 1DA9E0280 | 2CD4FF589 | 19B78A5A4 | 0CE67A7C6 | 12535A61C |
| 8 | 0984647CF | 0822BA46B | 3EB2BC076 | 212596F54 | 11CC2E64E | 120BADF9F | 0DA72CEDE | 30D0E106F |
| ... | ... | ... | ... | ... | ... | ... | ... | ... |
| 127 | 21C33416F | 18B894695 | 3AC062614 | 3537CF601 | 00A20A8B8 | 1CD10BAF5 | 394DF1DC0 | 0925851ED |

Table 2 to Table 4 include 128 sequences indexed by q from 0 to 127 in a hexadecimal format for segment 0, segment 1, and segment 2, respectively. The modulation sequence is obtained by converting a hexadecimal $X_i^{(q)}$ of a subblock into two QPSK symbols $v_{2i}^{(q)}$ 및 $v_{2i+1}^{(q)}$. The converting equations are as the following Math Figure.

MathFIG. 5

$$v_{2i}^{(q)} = \exp\{j\frac{\pi}{2}(2 \cdot b_{i,0}^{(q)} + b_{i,1}^{(q)})\} \quad [\text{Math. 5}]$$

$$v_{2i+1}^{(q)} = \exp\{j\frac{\pi}{2}(2 \cdot b_{i,2}^{(q)} + b_{i,3}^{(q)})\}$$

In Math Figure 5, i represents an integer between 0 and 8, q represents an integer between 0 and 127. $X_i^{(q)}$ can be defined as the following Math Figure.

MathFigure 6

$$X_i^{(q)} = 2^3 \cdot b_{i,0}^{(q)} + 2^2 \cdot b_{i,1}^{(q)} + 2^1 \cdot b_{i,2}^{(q)} + 2^0 \cdot b_{i,3}^{(q)} \quad [\text{Math.6}]$$

By the above Math Figure 5, binaries 00, 01, 10 and 11 are converted into 1, j, −1 and −j, respectively. For example, if sequence index q is 0, a sequence of subblock A is 314C8648F and the sequence is modulated to QPSK signal of [+1−j+1+j+j+1−j+1−1+1+j−1+j+1−1+1−j−j]. However, this is only exemplary, and $X_i^{(q)}$ can be converted into QPSK symbol by using another similar equation.

Meanwhile, the 128 sequences illustrated in each of the Tables 2 to 4 can be extended two times by complex conjugate operation. In other words, 128 sequences can be generated additionally by complex conjugate operation, and 128 to 255 indexes can be given to the generated sequences. Namely, SA-Preamble index of sequence index x corresponding to one segment ID is in complex conjugate relation with SA-Preamble sequence of sequence index x+128 corresponding to the one segment ID. The following Equation 6 represents sequence extended from parent sequence by complex conjugate operation.

MathFigure 7

$$v_k^{(q)} = (v_k^{(q-128)})^*, \text{ where } q=128, 129, \ldots, 254, 255 \quad [\text{Math.7}]$$

In Math Figure 7, k represents an integer between 0 and $N_{SAP}-1$, and $N_{SAP}$ represents a length of SA-Preamble. And, complex conjugate operation (•)* changes a complex signal of a+jb to a complex signal of a−jb, and changes a complex signal of a−jb to a complex signal of a+jb.

A circular shift is applied to over 3 consecutive sub-carriers after applying subcarrier mapping based on Math Figure 2. Each subblock has common offset. The circular shift pattern for each subblock is [2, 1, 0 . . . , 2, 1, 0, . . . , 2, 1, 0, 2, 1, 0, DC, 1, 0, 2, 1, 0, 2, . . . , 1, 0, 2, . . . , 1, 0, 2], where the shift is circularly right shift.

Figure 8:
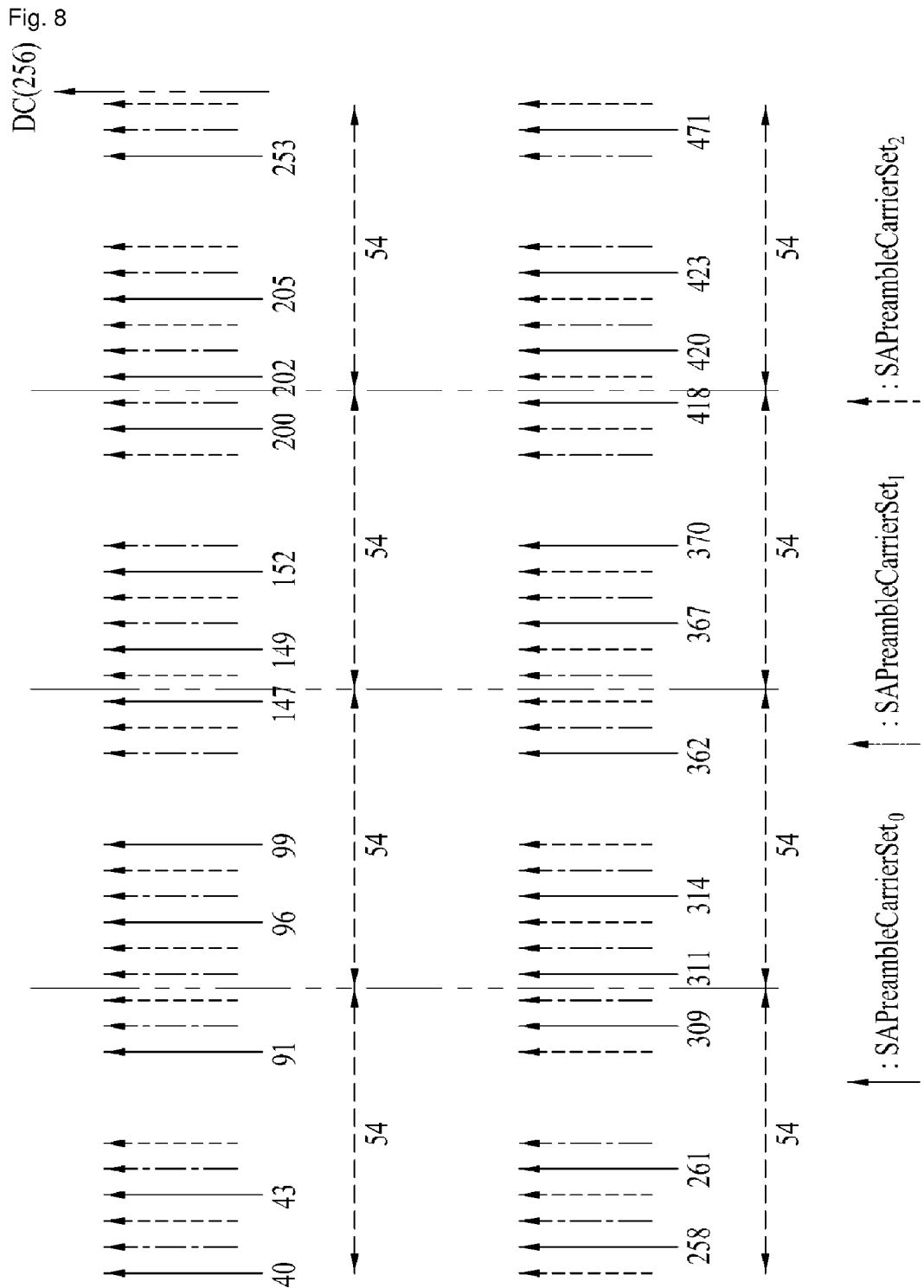
FIG. 8 illustrates the symbol structure of an SA-Preamble for 512-Fast Fourier Transform (FFT) in the frequency domain.

FIG. 8 illustrates the symbol structure of SA-Preamble in the frequency domain for 512-FFT.

For 512-FFT size, the sub-blocks (A, B, C, D, E, F, G, H) experience the following right circular shift (0, 2, 1, 0, 1, 0, 2, 1) respectively.

FIG. 9 illustrates configuring SA-Preambles corresponding to system bandwidths in the case of 512-FFT. Specifically, FIG. 9(a) illustrates a 5-MHz system bandwidth and an SA-Preamble for the 5-MHz system bandwidth and FIG. 9(b) illustrates a 10-MHz system bandwidth and an SA-Preamble for the 10-MHz system bandwidth.

Each system bandwidth is partitioned into a plurality of subbands. The system bandwidth is also partitioned into a plurality of subblocks that form an SA-Preamble. Each subband includes 4 PRUs, whereas each subblock includes 3 PRUs.

Referring to FIG. 9(a), a 5-MHz regular system bandwidth may be partitioned into 6 subbands. Since 6 subbands are equal to 24 PRUs (6×(4 PRUs)), the 5-MHz regular system bandwidth may correspond to an SA-Preamble including 8 subblocks (24 PRUs=8×(3 PRUs)).

Referring to FIG. 9(b), a 10-MHz regular system bandwidth may be partitioned into 12 subbands. Since 12 subbands are equal to 48 PRUs (12×(4 PRUs)), the 10-MHz regular system bandwidth may correspond to an SA-Preamble including 16 subblocks (48 PRUs=16×(3 PRUs)).

While not shown, a 20-MHz regular system bandwidth may be partitioned into 24 subbands. Since 24 subbands are equal to 96 PRUs (24×(4 PRUs)), the 20-MHz regular system bandwidth may correspond to an SA-Preamble including 32 subblocks (96 PRUs=32×(3 PRUs)).

Hence, the number of PRUs included in a regular system bandwidth is 24, 48 and 96, respectively for 5 MHz, 10 MHz and 20 MHz. Because 24, 48 and 96 are common multiples of 4 (4 PRUs is a basic subband unit) and 3 (3 PRUs is a basic subblock unit), the regular system bandwidths are equal to the lengths of the SA-Preambles, respectively. When the length of an SA-Preamble matches a system bandwidth, a SA-Preamble sequence represented by the subblocks of the SA-Preamble may indicate a cell ID and the system bandwidth supported by a BS may be known from the length of the SA-Preamble.

A UE can detect an SA-Preamble corresponding to a regular system bandwidth accurately. For example, if the BS supports the 5-MHz system bandwidth, the BS may transmit a PA-Preamble sequence corresponding to 5 MHz to UEs within its coverage. The UEs may determine the system bandwidth from the PA-Preamble sequence. For this operation, the BS and the UEs may have a table that defines the relationship between system bandwidths and PA-Preamble sequences. Referring to Table a, the BS may transmit, for example, a PA-Preamble sequence [6 DB4F3B16BCE59166C9CEF7C3C8CA5EDFC16A9D1-DC01F2AE6AA08F] to the UE. The UE may detect the PA-Preamble sequence and determine that the system bandwidth corresponding to the PA-Preamble sequence is 5 MHz, referring to Table 1. As illustrated in FIG. 9(a), the UE may receive an SA-Preamble sequence transmitted in 5 MHz based on the determined system bandwidth. The processor 400a of the UE may set the pass band of a reception filter to 5 MHz based on the PA-Preamble sequence.

Apart from an irregular system bandwidth including 12 PRUs (12 is a common multiple of 3 and 4), the irregular system bandwidth may not satisfy an integer multiple of a subband or an integer multiple of a subblock.

If an irregular system bandwidth created through tone dropping is not an integer multiple of a subband, subband partitioning is difficult. In order not to affect conventional subband-based permutation (subband partitioning), an irregular system bandwidth resulting from tone dropping should be an integer multiple of a subband. Hence, an irregular system bandwidth may be generated through subband-based tone dropping.

However, the subband-based tone dropping may result in an irregular system bandwidth that is not an integer multiple of a subblock. If the irregular system bandwidth is not an integer multiple of a subblock, this may affect detection of an SA-Preamble sequence including a plurality of subblocks.

Meanwhile, unless a system bandwidth does not match the length of an SA-Preamble in a one-to-one correspondence, it is not clear how long an SA-Preamble should be. For example, if the BS services an irregular system bandwidth of 8.33 MHz, it is not clear whether the BS should transmit an SA-Preamble including 14 subblocks or 12 subblocks in the 8.33-MHz irregular system bandwidth.

Even though the BS transmits a PA-Preamble representing a specific system bandwidth, it is not clear either what pass band the UE should set for a filter. For example, if the BS transmits a PA-Preamble sequence corresponding to 8.33 MHz, the UE may be aware that the system bandwidth is 8.33 MHz from the PA-Preamble sequence. However, the UE does not make sure if it should set the pass band of a reception filter so as to receive 14 sequence subblocks or 12 sequence subblocks in order to receive an SA-Preamble.

Even though the UE receives an SA-Preamble of a specific length, the UE is not sure of a system bandwidth corresponding to the PA-Preamble. For instance, in case of an SA-Preamble including 12 subblocks, the UE cannot determine whether the SA-Preamble is transmitted for a system bandwidth of 6.33 MHz or a system bandwidth of 8.33 MHz. While the BS indicates 8.33 MHz by a PA-Preamble sequence, the UE may determine that the SA-Preamble corresponds to 6.33 MHz. Considering that if a plurality of signals represent different system configurations, an error may occur to a wireless communication device, it is preferable that there is a one-to-one correspondence between a system bandwidth indicated by a PA-Preamble and an SA-Preamble corresponding to the system bandwidth.

Accordingly, the present invention provides methods for configuring an irregular system bandwidth and/or an SA-Preamble such that a one-to-one correspondence may be established among a PA-Preamble, a system bandwidth and an SA-Preamble.

Embodiment 1

(1-1) Configuration of Irregular System Bandwidth

Every irregular system bandwidth is configured using two subbands (i.e. 1.66 MHz) as a configuration granularity, like the regular system bandwidths, 5 MHz, 10 MHz and 20 MHz. In accordance with Embodiment 1, every system bandwidth that can be serviced by an operator may be spaced from its neighboring system bandwidth by a uniform gap, that is, a gap of 2 subbands. For instance, the regular system bandwidths include 6 subbands (5 MHz), 12 subbands (10 MHz) and 24 subbands (20 MHz), respectively. Irregular system bandwidths between 5 MHz and 10 MHz include 8 subbands (6.66 MHz) and 10 subbands (8.33 MHz), respectively. Irregular system bandwidths between 10 MHz and 20 MHz may include 14 subbands (11.66 MHz), 16 subbands (13.33 MHz), 18 subbands (15 MHz), 20 subbands (16.66 MHz), and 22 subbands (18.33 MHz), respectively.

In addition, the regular and irregular system bandwidths within 5 MHz to 20 MHz may be indicated by at least 10 PA-Preamble indexes. The following table illustrates an exemplary relationship between irregular system bandwidths configured according to the present invention and PA-Preamble indexes corresponding to the irregular system bandwidths.

TABLE 5

| Index | BW | Series to modulate |
|---|---|---|
| 0 | 5 MHz | — |
| 1 | 10 MHz | — |
| 2 | 20 MHz | — |
| 3 | 6.66 MHz | — |
| 4 | 8.33 MHz | — |
| 5 | 11.66 MHz | — |
| 6 | 13.33 MHz | — |
| 7 | 15 MHz | — |
| 8 | 16.66 MHz | — |
| 9 | 18.33 MHz | — |

The bandwidths listed in Table 5 may be arranged in ascending order and indexed as follows.

TABLE 6

| Index | BW | Series to modulate |
|---|---|---|
| 0 | 5 MHz | — |
| 1 | 6.66 MHz | — |
| 2 | 8.33 MHz | — |
| 3 | 10 MHz | — |
| 4 | 11.66 MHz | — |
| 5 | 13.33 MHz | — |
| 6 | 15 MHz | — |
| 7 | 16.66 MHz | — |
| 8 | 18.33 MHz | — |
| 9 | 20 MHz | — |

In Table 5 and Table 6, a unique PA-Preamble series may be defined for each bandwidth. Table 7 and Table 8 illustrate examples of PA-Preamble series corresponding to the indexed bandwidths of Table 5 and Table 6.

TABLE 7

| Index | BW | Series to modulate |
|---|---|---|
| 0 | 5 MHz | 6DB4F3B16BCE59166C9CEF7C3C8CA5EDFC16 A9D1DC01F2AE6AA08F |

TABLE 7-continued

| Index | BW | Series to modulate |
|---|---|---|
| 1 | 10 MHz | 1799628F3B9F8F3B22C1BA19EAF94FEC4D37D EE97E027750D298AC |
| 2 | 20 MHz | 92161C7C19BB2FC0ADE5CEF3543AC1B6CE6B E1C8DCABDDD319EAF7 |
| 3 | 6.66 MHz | 6DE116E665C395ADC70A89716908620868A603 40BF35ED547F8281 |
| 4 | 8.33 MHz | BCFDF60DFAD6B027E4C39DB20D783C9F4671 55179CBA31115E2D04 |
| 5 | 11.66 MHz | 7EF1379553F9641EE6ECDBF5F144287E329606 C616292A3C77F928 |
| 6 | 13.33 MHz | 7EF1379553F9641EE6ECDBF5F144287E329606 C616292A3C77F928 |
| 7 | 15 MHz | DA8CE648727E4282780384AB53CEEBD1CBF79 E0C5DA7BA85DD3749 |
| 8 | 16.66 MHz | 3A65D1E6042E8B8AADC701E210B5B4B650B6 AB31F7A918893FB04A |
| 9 | 18.33MHz | D46CF86FE51B56B2CAA84F26F6F204428C1BD 23F3D888737A0851C |

TABLE 8

| Index | BW | Series to modulate |
|---|---|---|
| 0 | 5 MHz | 6DB4F3B16BCE59166C9CEF7C3C8CA5EDFC16 A9D1DC01F2AE6AA08F |
| 1 | 6.66 MHz | 6DE116E665C395ADC70A89716908620868A603 40BF35ED547F8281 |
| 2 | 8.33 MHz | BCFDF60DFAD6B027E4C39DB20D783C9F4671 55179CBA31115E2D04 |
| 3 | 10 MHz | 1799628F3B9F8F3B22C1BA19EAF94FEC4D37D EE97E027750D298AC |
| 4 | 11.66 MHz | 7EF1379553F9641EE6ECDBF5F144287E329606 C616292A3C77F928 |
| 5 | 13.33 MHz | 8A9CA262B8B3D37E3158A3B17BFA4C9FCFF4 D396D2A93DE65A0E7C |
| 6 | 15 MHz | DA8CE648727E4282780384AB53CEEBD1CBF79 E0C5DA7BA85DD3749 |
| 7 | 16.66 MHz | 3A65D1E6042E8B8AADC701E210B5B4B650B6 AB31F7A918893FB04A |
| 8 | 18.33 MHz | D46CF86FE51B56B2CAA84F26F6F204428C1BD 23F3D888737A0851C |
| 9 | 20 MHz | 92161C7C19BB2FC0ADE5CEF3543AC1B6CE6B E1C8DCABDDD319EAF7 |

An irregular system bandwidth may be configured by dropping subbands at the left and the right ends of a regular system bandwidth, symmetrically with respect to the DC, or dropping a subband (subbands) only at the left or right end with respect to the DC. It is typical in the nature of OFDMA to design a wireless system symmetrically with respect to the DC. Therefore, preferably, an irregular system bandwidth is configured by dropping subbands from a regular system band symmetrically with respect to the DC.

The UE may determine an OFDMA parameter used for communication with the BS as well as a system bandwidth, from a PA-Preamble sequence. Specifically, the UE may determine, from a received PA-Preamble sequence, the number of subcarriers, the number of left guard subcarriers, and the number of right guard subcarrier in the system bandwidth. Table 9 below lists exemplary OFDMA parameters for each system bandwidth configured according to Embodiment 1.

TABLE 9

| BW | Number of used subcarriers (including DC) | Number of left guard subcarriers | Number of right guard subcarriers |
|---|---|---|---|
| 5 MHz | 433 | 40 | 39 |
| 6.66 MHz | 577 | TBD | TBD |

TABLE 9-continued

| BW | Number of used subcarriers (including DC) | Number of left guard subcarriers | Number of right guard subcarriers |
|---|---|---|---|
| 8.33 MHz | 721 | TBD | TBD |
| 10 MHz | 865 | 80 | 79 |
| 11.66 MHz | 1009 | TBD | TBD |
| 13.33 MHz | 1153 | TBD | TBD |
| 15 MHz | 1297 | TBD | TBD |
| 16.66 MHz | 1441 | TBD | TBD |
| 18.33 MHz | 1586 | TBD | TBD |
| 20 MHz | 1729 | 160 | 159 |

In Table 9, TBD is a value to be decided later. For each system band, the number of subcarriers and the numbers of guard subcarriers may be determined uniquely.

(1-2) Configuration of SA-Preamble

The length of an SA-Preamble may be different from a TD-BW. In Embodiment 1 of the present invention, the SA-Preamble for a bandwidth which is tone-dropped on a subband basis with respect to the DC is configured to include a minimum number of sequence subblocks that make the length of the SA-Preamble equal to or larger than the TD-BW. In other words, an SA-Preamble having the smallest number of sequence subblocks among SA-Preambles as long as or longer than the TD-BW is corresponding to the TD-BW. Herein, the difference between the TD-BW and the length of the SA-Preamble does not exceed the size of one subband.

Figure 10:
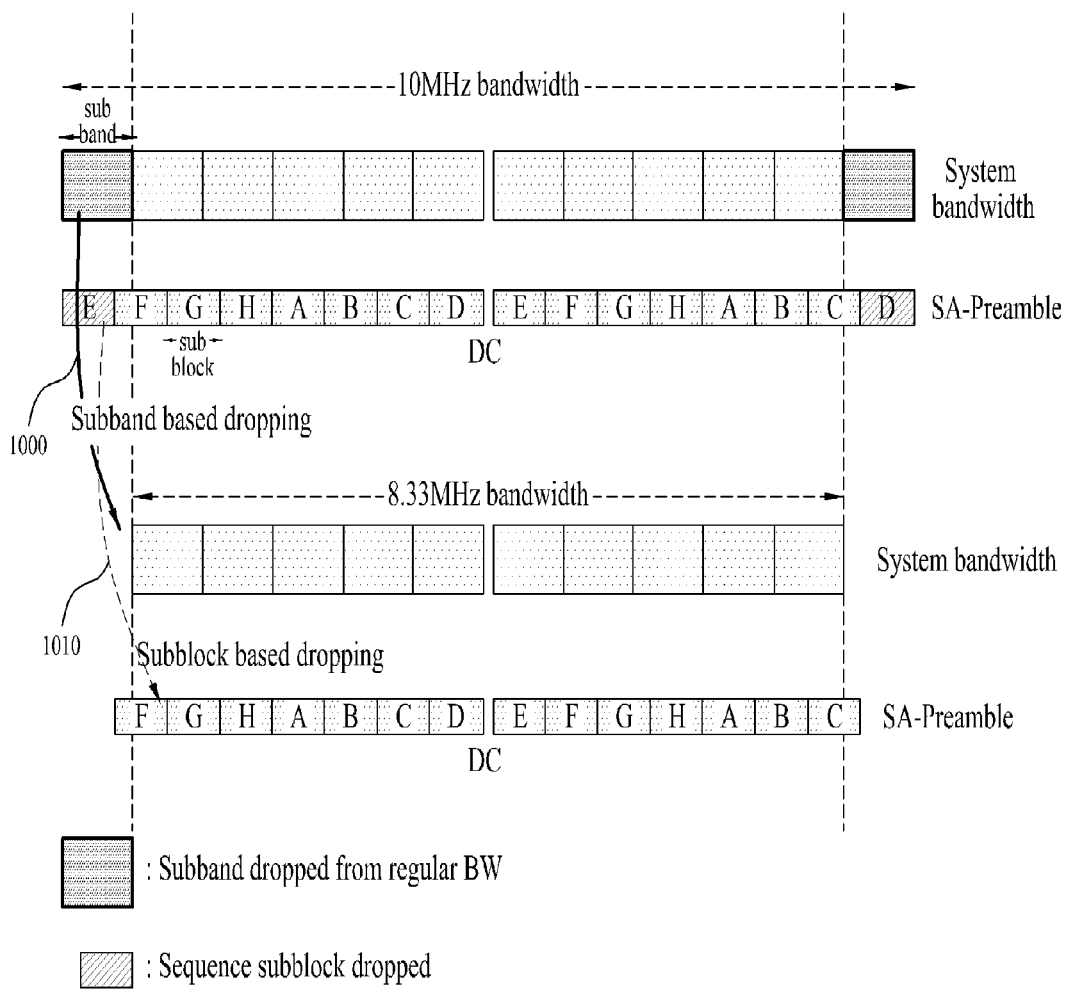
FIGS. 10, 11 and 12 illustrate configuring irregular system bandwidths and SAPreambles according to an embodiment of the present invention.
Figure 11:
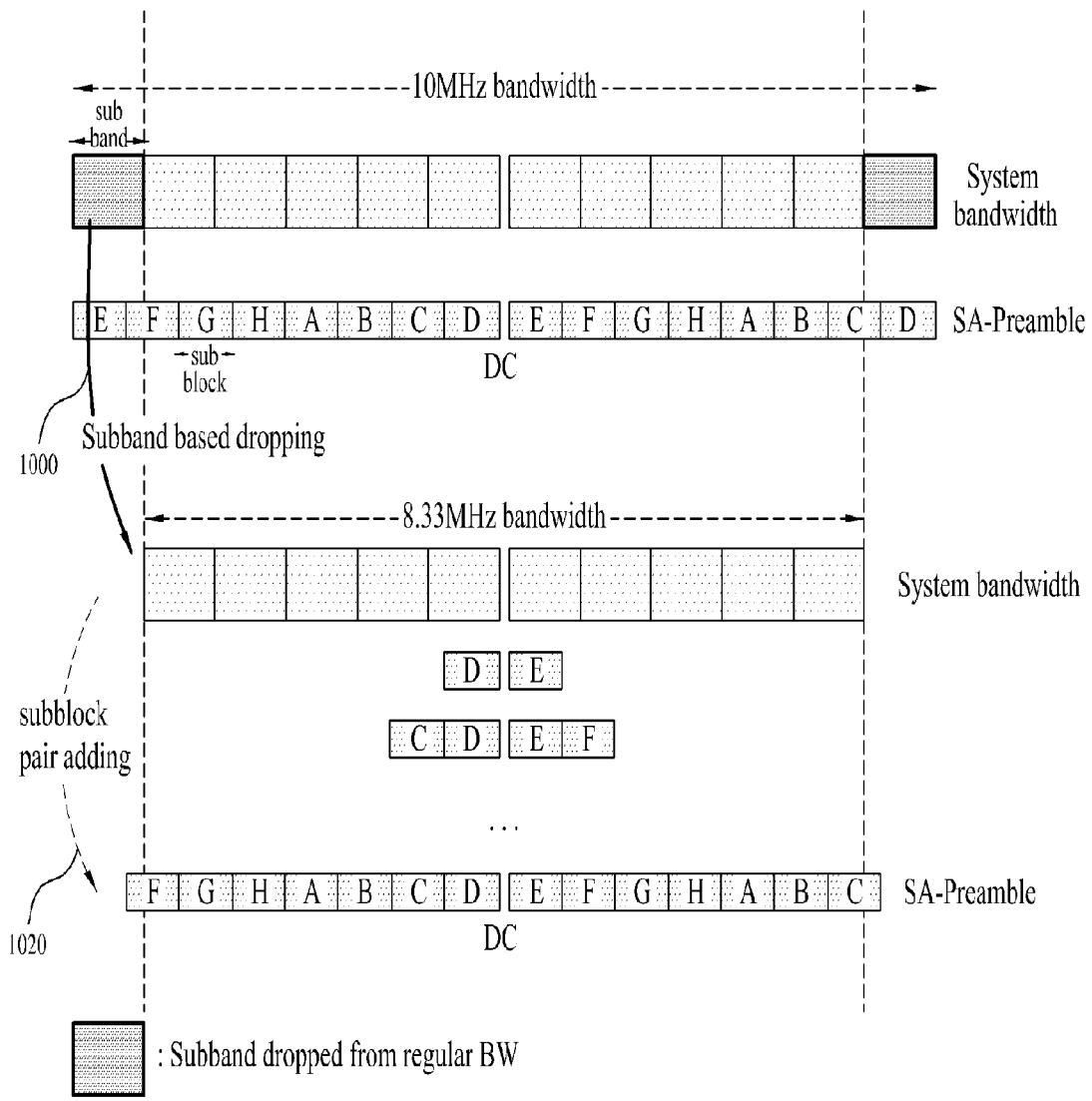
Figure 12:
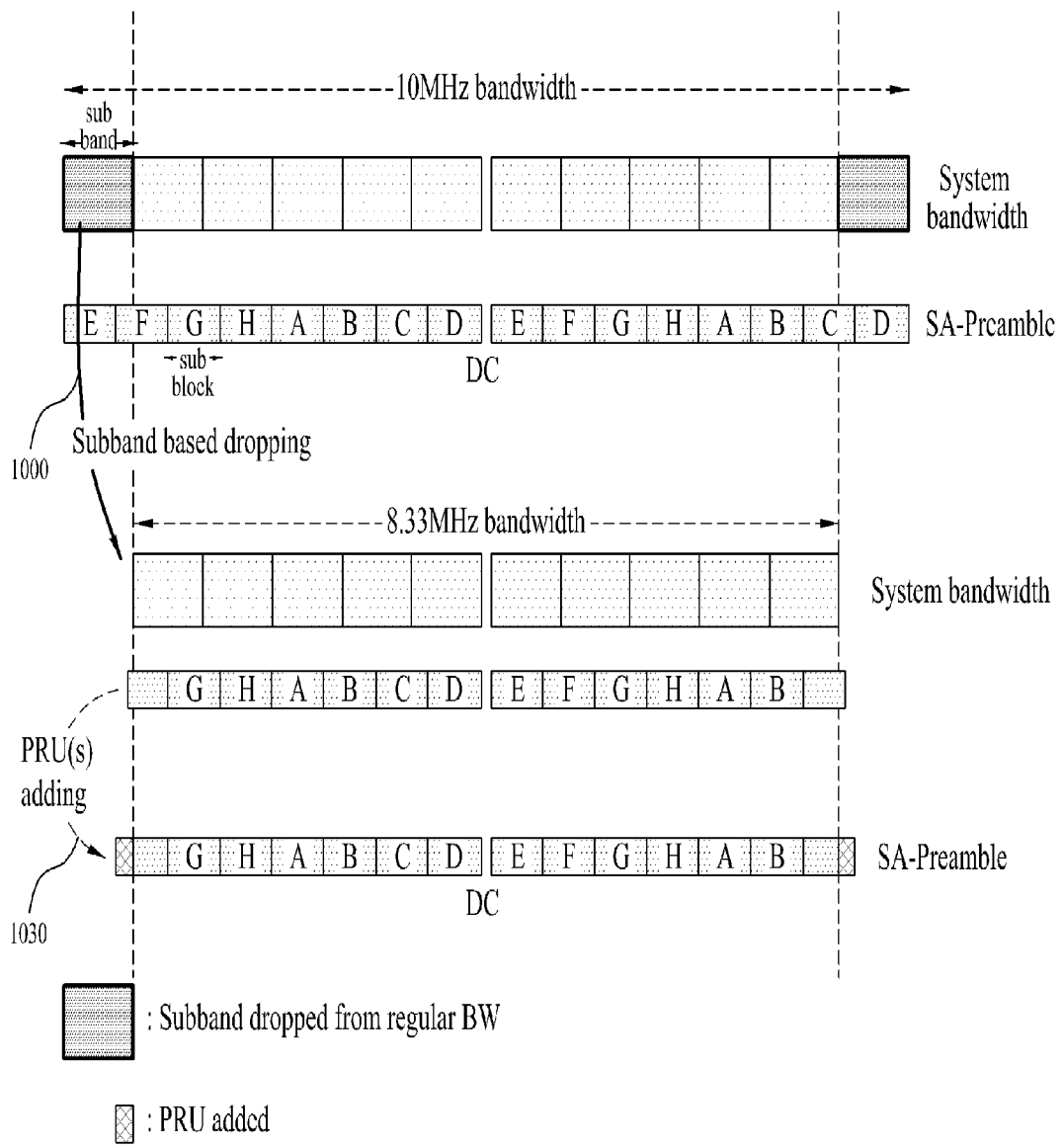

FIGS. 10, 11 and 12 illustrate configuring irregular system bandwidths and SAPreambles according to Embodiment 1. Particularly, FIGS. 10, 11 and 12 illustrate tone dropping of a 10-MHz regular system bandwidth to an 8.33-MHz irregular system bandwidth.

Referring to FIGS. 10, 11 and 12, in order to configure the 8.33-MHz irregular system bandwidth from the 10-MHz regular system bandwidth as indicated by reference numeral 1000, subbands are dropped from the left and right ends of the 10-MHz regular system bandwidth. This means that two subbands (1.66 MHz) are symmetrically dropped from the 10-MHz regular system bandwidth with respect to the DC.

In accordance with Embodiment 1, an SA-Preamble is generated, which has a minimum length equal to or larger than a TD-BW. Examples of configuring an SA-Preamble having a minimum length equal to or larger than a TD-BW will be described with reference to FIGS. 10, 11 and 12.

Referring to FIG. 10, an SA-Preamble of a minimum length equal to or larger than a TD-BW may be generated by dropping a maximum number of sequence blocks from an SA-Preamble subblock sequence corresponding to a regular system bandwidth such that a bandwidth carrying the SA-Preamble is equal to or larger than the TD-BW. As far as the condition that the transmission bandwidth of the SA-Preamble is equal to or larger than the TD-BW is satisfied, as many sequence subblocks as possible may be dropped from the SA-Preamble sequence of the regular system bandwidth to thereby configure the SA-Preamble. The difference between the TD-BW and the length of the SA-Preamble does not exceed one subband. As indicated by reference numeral 1010, as many SA-Preamble sequence subblocks as possible are dropped from the left and right ends of the SA-Preamble sequence corresponding to the regular system bandwidth, only if the bandwidth of the SA-Preamble is equal to or larger than the TD-BW with respect to the DC component. The BS processor 400b may configure an SA-Preamble by dropping a maximum number of sequence subblocks from both ends of a regular system bandwidth, symmetrically with respect to the DC component, as far as a bandwidth required to transmit the SA-Preamble is equal to or larger than a TD-BW.

Referring to FIG. 11, as indicated by reference numeral 1020, an SA-Preamble may be generated by adding a minimum number of sequence blocks to each of the left and right sides of a TD-BW with respect to the DC component such that a bandwidth carrying the SA-Preamble is equal to or larger than the TD-BW. That is, an SA-Preamble of a minimum length satisfying the condition that the bandwidth of the SA-Preamble is equal to or larger than the TD-BW corresponds to the TD-BW. The difference between the length of the SA-Preamble and the TD-BW does not exceed one subband. The BS processor 400*b* may configure the SA-Preamble by adding a minimum number of sequence subblocks to each of both ends, symmetrically with respect to the DC component, such that a bandwidth required to transmit the SA-Preamble is equal to or larger than the TD-BW. The BS processor 400*b* may configure the SA-Preamble in a manner that makes the difference between the length of the SA-Preamble and the TD-BW be equal to or less than one subband.

width indicated by a PA-Preamble sequence is one-to-one mapped to the configuration of the SA-Preamble, the length of an SA-Preamble to be transmitted by the BS for a specific system bandwidth is specified. Therefore, obscurity involved in configuring an SA-Preamble at the BS is eliminated. On the part of the UE, the reception rate of an SA-Preamble is increased because the length of an SA-Preamble for a system bandwidth indicated by a PA-Preamble is known. An SA-Preamble carries a cell ID. Hence, accurate acquisition of an SA-Preamble sequence leads to accurate acquisition of a cell ID. Considering that data and/or control information can be transmitted to and received from a BS only when the cell ID of the BS is acquired, SA-Preamble transmission according to Embodiment 1 has a positive influence on improvement of communication performance in an irregular system bandwidth.

The relationship between system bandwidths and SA-Preamble sequence subblocks according to Embodiment 1 may be illustrated in Table 10 below.

TABLE 10

| BW (MHz) | Dropped subband(s) | Dropped subblock(s) | Allocation of sequence subblocks for SA-preamble |
|---|---|---|---|
| 5 | 0 | 0 | ABCD \| EFGH |
| 6.66 | 4 | 4 | GHABCD \| EFGHAB |
| 8.33 | 2 | 2 | FGHABCD \| EFGHABC |
| 10 | 0 | 0 | EFGHABCD \| EFGHABCD |
| 11.66 | 10 | 12 | CDEFGHABCD \| EFGHABCDEF |
| 13.66 | 8 | 10 | BCDEFGHABCD \| EFGHABCDEFG |
| 15 | 6 | 8 | ABCDEFGHABCD \| EFGHABCDEFGH |
| 16.66 | 4 | 4 | GHABCDEFGHABCD \| EFGHABCDEFGHAB |
| 18.33 | 2 | 2 | FGHABCDEFGHABCD \| EFGHABCDEFGHABC |
| 20 | 0 | 0 | EFGHABCDEFGHABCD \| EFGHABCDEFGHABCD |

Referring to FIG. 12, an SA-Preamble may be generated by adding a minimum number of subcarriers or PRUs that do not exceed the size of a subband to each of both ends of a bandwidth corresponding to the TD-BW, with respect to the DC component, such that the length of the SA-Preamble is an integer multiple of the length of sequence subblocks, as indicated by reference numeral 1030. The BS processor 400*b* may configure an SA-Preamble by adding a minimum number of subcarriers or PRUs to both ends of a bandwidth corresponding to the TD-BW with respect to the DC component, as far as the length of the SA-Preamble is an integer number of the length of sequence subblocks.

In accordance with Embodiment 1, since an SA-Preamble has a maximum length approximate to a system bandwidth, the detection performance of the SA-Preamble at a UE is increased. In addition, as the configuration of a system band- Alternatively, an SA-Preamble including a predetermined number of subblocks may be mapped to a specific range of system bandwidths.

TABLE 11

| BW(MHz) | Dropped subband(s) | Dropped subblock(s) | Allocation of sequence subblocks for SA-preamble |
|---|---|---|---|
| 5 <= BW < 6.66 | 0 | 0 | ABCD \| EFGH |
| 6.66 <= BW < 8.33 | 4 | 4 | GHABCD \| EFGHAB |
| 8.33 <= BW < 10 | 2 | 2 | FGHABCD \| EFGHABC |
| 10 <= BW < 11.66 | 0 | 0 | EFGHABCD \| EFGHABCD |
| 11.66 <= BW < 13.66 | 10 | 12 | CDEFGHABCD \| EFGHABCDEF |
| 13.66 <= BW < 15 | 8 | 10 | BCDEFGHABCD \| EFGHABCDEFG |
| 15 <= BW < 16.66 | 6 | 8 | ABCDEFGHABCD \| EFGHABCDEFGH |
| 16.66 <= BW < 18.33 | 4 | 4 | GHABCDEFGHABCD \| EFGHABCDEFGHAB |
| 18.33 <= BW < 20 | 2 | 2 | FGHABCDEFGHABCD \| EFGHABCDEFGHABC |
| 20 | 0 | 0 | EFGHABCDEFGHABCD \| EFGHABCDEFGHABCD |

Referring to Table 10 and Table 11, Dropped subband(s) denotes the number of subbands dropped from a regular system bandwidth to configure a system bandwidth, and Dropped subblock(s) denotes the number of subblocks dropped from an SA-Preamble sequence corresponding to a regular system bandwidth in order to configure an SA-Preamble corresponding to a predetermined system bandwidth.

The BS processor 400*b* may configure the irregular system bandwidths of 6.66 MHz and 8.33 MHz by dropping predetermined numbers of subbands from, for example, the 10-MHz regular system bandwidth. The BS processor 400*b* may configure a PA-Preamble sequence corresponding to a system bandwidth to be serviced by it and may control the BS transmitter 100b to transmit the PA-Preamble sequence in the first symbol of the second frame F1 of a superframe. For instance, the 8.33-MHz bandwidth is configured by dropping two subbands from the 10-MHz regular system bandwidth. The BS processor 400b configures a PA-Preamble sequence corresponding to the bandwidth of 8.33 MHz. The BS transmitter 100b transmits the PA-Preamble sequence in the first symbol of the second frame F1 of a superframe under the control of the BS processor 400b. In addition, the BS processor 400b generates an SA-Preamble having subblocks FGHABCD at the left side and subblocks EFGHABC at the right side with respect to the DC, in correspondence with the bandwidth of 8.33 MHz and provides the SA-Preamble to the BS transmitter 100b. The BS transmitter 100b then transmits the SA-Preamble in the first and third frames F0 and F3 of the superframe under the control of the BS processor 400b. The subcarrier mappers 140 to 140-K of the BS may map the SA-Preamble to subcarriers according to Math Figure 2 under the control of the BS processor 400b. The SA-Preamble is transmitted to UEs on subcarriers determined by Math Figure 2 in the first and third frames F0 and F2 of the superframe.

The UE receiver 300a receives the PA-Preamble and provides the PA-Preamble to the UE processor 400a. The UE processor 400a acquires system bandwidth information from the sequence of the PA-Preamble and adjusts the pass band of the reception filter in the UE receiver 300a according to the system bandwidth information. The UE processor 400a may adjust the pass band of the reception filter in a manner that enables effective reception of an SA-Preamble corresponding to a system bandwidth indicated by the system bandwidth information. For example, if a system bandwidth corresponding to the PA-Preamble sequence is 8.33 MHz, the UE processor 400a may control the UE receiver 300a to configure a reception filter so that the reception filter may pass an SA-Preamble sequence including 14 subblocks. Alternatively, the UE processor 400a may acquire an SA-Preamble transmitted by the BS by detecting 14 sequence subblocks corresponding to 8.33 MHz from among SA-Preamble signals passed through a reception filter having a sufficiently large size. The UE processor 400a may acquire the cell ID of the BS based on the acquired SA-Preamble.

Embodiment 2

(2-1) Configuration of Irregular System Bandwidth

Compared to Embodiment 1 in which two subbands (1.66 MHz) are used as a configuration granularity for configuring a system bandwidth, a PRU having 18 subcarriers is used as a configuration granularity in Embodiment 2. Embodiment 2 offers the benefit of increasing the number of system bandwidths available to an operator. In other words, more system bandwidth choices are open to the operator than in Embodiment 1. According to Embodiment 2, a system bandwidth may not be an integer multiple of a subband.

In Embodiment 2, all irregular system bandwidths may be configured using two PRUs as a configuration granularity. In this case, every system bandwidth between 5 MHz with 24 PRUs and 20 MHz with 96 PRUs is spaced from its adjacent bandwidth by a uniform gap of 2 PRUs. When each bandwidth is apart from its adjacent bandwidth by 2 PRUs and a system bandwidth is configured using 2 PRUs as a configuration granularity, at least 37 PA-Preamble sequences are defined to indicate the system bandwidths. For instance, the configuration granularity of 2 PRUs is equivalent to about 0.417 MHz (0.416666 . . . MHz). For instance, system bandwidths of about 9.583 MHz, about 9.166 MHz, about 8.749 MHz, and about 8.332 MHz may be configured by sequentially dropping 2 PRUs from 10 MHz, and PA-Preamble sequences specific to the system bandwidths may be defined.

An irregular system bandwidth may be configured by dropping PRUs from the left and the right ends of a regular system bandwidth, symmetrically with respect to the DC or dropping a PRU (PRUs) only at the left or right side of the DC. It is typical in the nature of OFDMA to design a wireless system symmetrically with respect to the DC. Therefore, preferably, an irregular system bandwidth is configured by dropping PRUs symmetrically with respect to the DC from a regular system bandwidth.

If frequency permutation applies to the irregular system bandwidth, miniband permutation may be performed, in which resources of a size smaller than a subband, that is, resources including one to three PRUs are permuted on a PRU basis.

(2-2) Configuration of SA-Preamble

The UE detects an SA-Preamble on a subblock-by-subblock basis. Therefore, if the SA-Preamble sequence does not include an integer number of subblocks, the UE may not accurately detect the SA-Preamble or takes a long time to detect the SA-Preamble. As a consequence, the detection performance of a cell ID is degraded. To avert this problem, while tone dropping takes place on a PRU basis, an SA-Preamble corresponding to the TD-BW is configured so as to have a length being an integer multiple of a subblock.

(2-2-1) SA-Preamble Shorter than TD-BW

An SA-Preamble corresponding to a TD-BW may be configured to include a maximum number of sequence subblocks such that the length of the SA-Preamble is equal to or less than the TD-BW.

As the length of the SA-Preamble is more approximate to a system bandwidth, the UE may detect the SA-Preamble better. The difference between a bandwidth created through PRU-based tone dropping and an SA-Preamble configured to be as long as or shorter than the PRU-based TD-BW is narrower than the difference between a bandwidth created through subband (4 PRUs)-based tone dropping and an SA-Preamble configured to be as long as or shorter than the subband-based TD-BW. Accordingly, even though an SA-Preamble is configured to be shorter than a PRU-based TD-BW, the performance of the SA-Preamble is not degraded much.

Figure 13:
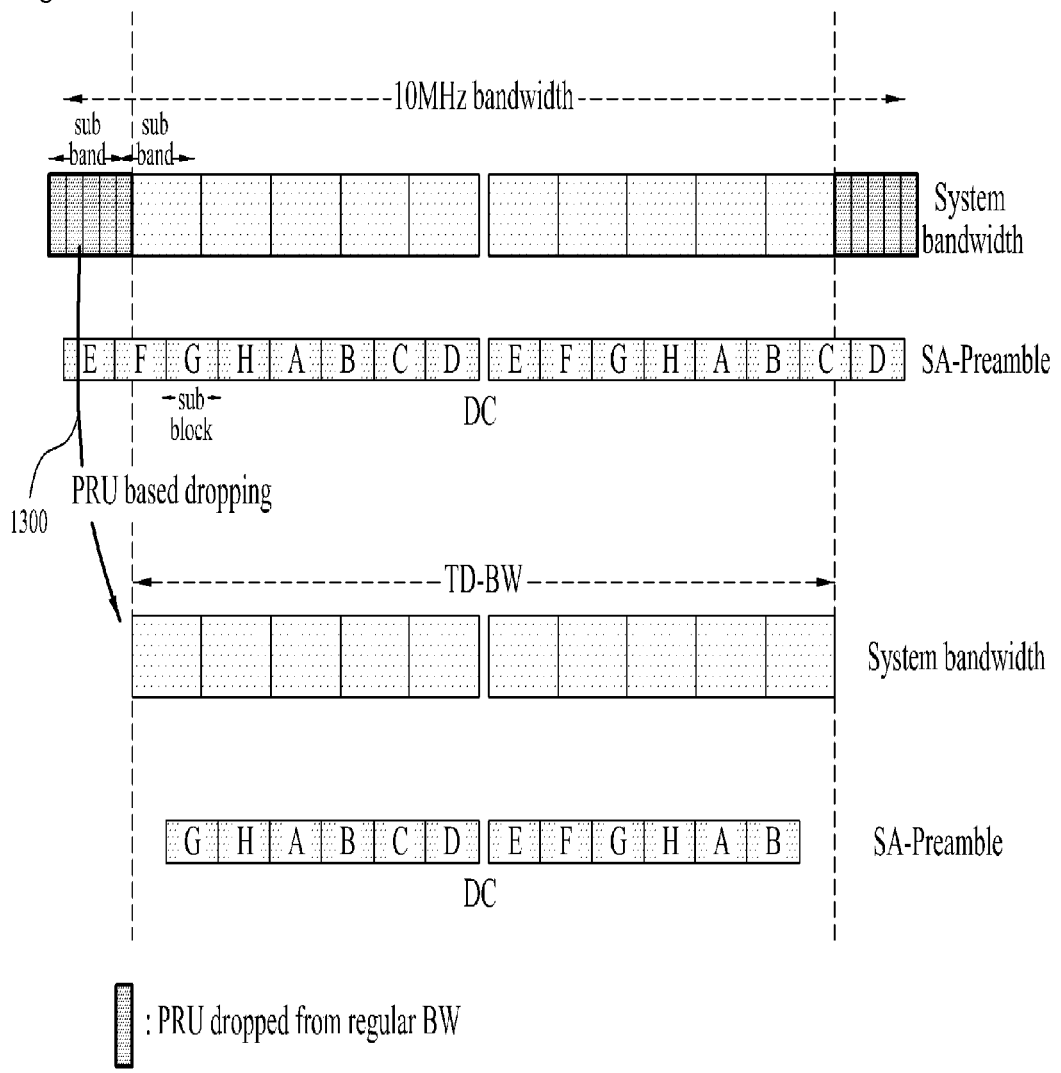
FIG. 13 illustrates configuring an irregular system bandwidth according to another embodiment (Embodiment 2) of the present invention and configuring an SA-Preamble according to (2-2-1) of the embodiment (Embodiment 2) of the present invention.

FIG. 13 illustrates configuring an irregular system bandwidth according to Embodiment 2 and the structure of configuring an SA-Preamble according to (2-2-1) of Embodiment 2. Particularly, FIG. 13 illustrates a case where the regular system bandwidth of 10 MHz is PRU-based tone-dropped.

Referring to FIG. 13, a TD-BW is configured by dropping 5 PRUs at each of the left and right ends of the 10-MHz regular system bandwidth with respect to the DC component, as indicated by reference numeral 1300.

An SA-Preamble corresponding to the TD-BW is configured with a maximum number of subblocks that do not make the length of the SA-Preamble exceed the TD-BW, that is, a total of 12 sequence subblocks. More specifically, the SA-Preamble includes 6 sequence subblocks at the right side and 6 sequence subblock at the left side.

The SA-Preamble of a length equal to or smaller than the TD-BW may be configured by, for example, dropping a minimum number of sequence subblocks such that a bandwidth carrying the SA-Preamble is equal to or less than the TD-BW. In another example, the SA-Preamble of a length equal to or smaller than the TD-BW may be configured by adding a maximum number of sequence subblocks to each of the left and right sides of the TD-BW with respect to the DC such that the bandwidth carrying the SA-Preamble is equal to or less than the TD-BW. In a further example, the SA-Preamble of a length equal to or smaller than the TD-BW may be configured by dropping a minimum number of subcarriers or PRUs such that the length of the SA-Preamble is an integer multiple of a sequence subblock.

The number of subblocks in an SA-Preamble sequence corresponding to the TD-BW may be determined by MathFigure 8

$$N_{subblocks} = \text{floor}(N_{TD\_PRU}/N_{PRUofSubblocks}) \quad [\text{Math.8}]$$

where $N_{subblocks}$ denotes the number of left/right subblocks with respect to the DC, $N_{TD\_PRU}$ denotes the number of left/right PRUs with respect to the DC in the TD-BW, and $N_{PRUofSubblocks}$ denotes the number of PRUs per subblock, herein 3. For example, if $N_{TD\_PRU}$ is 19 for the left PRUs with respect to the DC, the number of subblocks to the left of the DC component in the SA-Preamble is 6(=floor(19/3)). If $N_{TD\_PRU}$ is 21 for the right PRUs with respect to the DC, the number of subblocks to the right of the DC component in the SA-Preamble is 7(=floor(21/3)).

(2-2-2) SA-Preamble Longer than TD-BW

An SA-Preamble corresponding to a TD-BW may be configured to include a maximum number of sequence subblocks such that the length of the SA-Preamble is equal to or larger than the TD-BW. This is because as the SA-Preamble is longer, the detection performance of the SA-Preamble is increased. The difference between the TD-BW and the length of the SA-Preamble is preferably equal to or less than a subband size. This is because as the SA-Preamble is longer, the detection performance of the SA-Preamble is increased.

Figure 14:
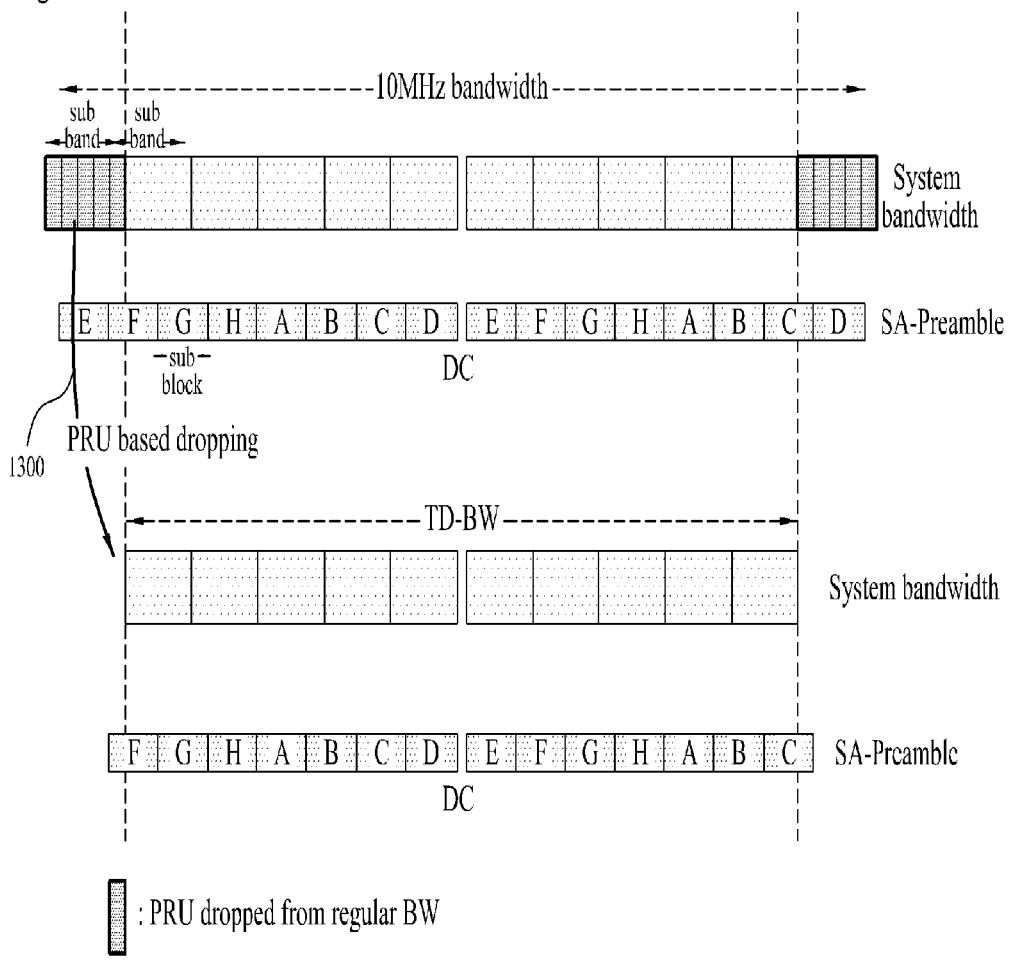
FIG. 14 illustrates configuring an irregular system bandwidth according to the embodiment (Embodiment 2) of the present invention and configuring an SA-Preamble according to (2-2-1) of the embodiment (Embodiment 2) of the present invention.

FIG. 14 illustrates configuring an irregular system bandwidth according to Embodiment 2 and configuring an SA-Preamble according to (2-2-2) of Embodiment 2. Particularly, FIG. 14 illustrates a case where the regular system bandwidth of 10 MHz is subject to PRU-based tone-dropping.

Referring to FIG. 14, a TD-BW is configured by dropping 5 PRUs at each of the left and right ends of the 10-MHz regular system bandwidth with respect to the DC component, as indicated by reference numeral 1300.

An SA-Preamble corresponding to the TD-BW is configured with a minimum number of subblocks that make the length of the SA-Preamble equal to or larger than the TD-BW, that is, a total of 14 sequence subblocks. More specifically, the SA-Preamble includes 7 sequence subblocks at the right side and 7 sequence subblock at the left side.

The SA-Preamble of a length equal to or larger than the TD-BW may be configured by, for example, dropping a maximum number of sequence subblocks from an SA-Preamble sequence corresponding to a regular system bandwidth such that a bandwidth carrying the SA-Preamble is equal to or larger than the TD-BW. That is, as far as the condition that a bandwidth necessary to transmit the SA-Preamble is equal to or larger than the TD-BW is satisfied, as many sequence subblocks as possible may be dropped from the SA-Preamble sequence of the regular system bandwidth to thereby configure the SA-Preamble corresponding to the TD-BW. In another example, the SA-Preamble of a length equal to or larger than the TD-BW may be configured by adding a minimum number of sequence subblocks to each of the left and right sides of the TD-BW with respect to the DC such that a bandwidth carrying the SA-Preamble is equal to or larger than the TD-BW. In a further example, the SA-Preamble of a length equal to or larger than the TD-BW may be configured by dropping a minimum number of subcarriers or PRUs such that the length of the SA-Preamble is an integer multiple of a sequence subblock.

The number of subblocks in an SA-Preamble sequence corresponding to the TD-BW may be determined by MathFigure 9

$$N_{subblocks} = \text{ceil}(N_{TD\_PRU}/N_{PRUofSubblocks}) \quad [\text{Math.9}]$$

where $N_{subblocks}$ denotes the number of left/right subblocks with respect to the DC in the SA-Preamble, $N_{TD\_PRU}$ denotes the number of left/right PRUs with respect to the DC in the TD_BW, and $N_{PRUofSubblocks}$ denotes the number of PRUs per subblock, herein 3. For example, if $N_{TD\_PRU}$ is 19 for the left PRUs with respect to the DC, the number of subblocks to the left of the DC component in the SA-Preamble is 7 (ceil(19/3)). If $N_{TD\_PRU}$ is 21 for the right PRUs with respect to the DC, the number of subblocks to the right of the DC component in the SA-Preamble is 7 (=ceil(21/3)).

The BS processor 400b may configure an irregular system bandwidth (referred to as a TD-BW) by dropping one or more PRUs from a regular system bandwidth and control the BS transmitter 100b to transmit a PA-Preamble sequence corresponding to the TD-BW. In addition, the BS processor 400b may configure an SA-Preamble corresponding to the TD-BW according to Embodiment (2-2-1) or (2-2-2). The BS transmitter 100b transmits the SA-Preamble in the first and third frames F0 and F2 of a superframe under the control of the BS controller 400b. The subcarrier mappers 140 to 140-K of the BS may map the SA-Preamble to subcarriers according to Math Figure 2 [Equation 2] under the control of the BS processor 400b. The SA-Preamble is transmitted to UEs on subcarriers determined by Math Figure 2 [Equation 2] in the first and third frames of the superframe.

The UE receiver 300a receives the PA-Preamble and provides the PA-Preamble to the UE processor 400a. The UE processor 400a acquires system bandwidth information from the sequence of the PA-Preamble and adjusts the pass band of the reception filter in the UE receiver 300a according to the system bandwidth information. The UE processor 400a may adjust the pass band of the reception file in a manner that enables effective reception of an SA-Preamble corresponding to a system bandwidth indicated by the system bandwidth information. Alternatively, the UE processor 400a may acquire an SA-Preamble transmitted by the BS by detecting sequence subblocks corresponding to the length of the SA-Preamble signal corresponding to the TD-BW indicated by the PA-Preamble among SA-Preamble signals passed through a reception filter having a sufficiently large size. The UE processor 400a may acquire the cell ID of the BS based on the acquired SA-Preamble.

Embodiment 3

(3-1) Configuration of Irregular System Bandwidth

Instead of a subband, a subblock is used as a configuration granularity in Embodiment 3. According to Embodiment 3, an operator may configure an irregular system bandwidth by dropping an integer number of subblocks from a regular system bandwidth.

In this case, the irregular system bandwidth may not be an integer multiple of a subband. Hence, miniband permutation may be applied, in which permutation is performed on at least mod($N_{TD\_PRU}/N_{PRUofSubands}$) PRUs on a PRU basis. $N_{PRUofSubands}$ denotes the number of PRUs per subband and $N_{TD\_PRU}$ denotes the number of left/right PRUs of the TD-BW with respect to the DC.

In Embodiment 3, 2 subblocks are used as a configuration granularity for configuring an irregular system bandwidth. In this case, every system bandwidth between 5 MHz with 8 subblocks and 20 MHz with 32 subblocks is spaced from its adjacent bandwidth by a uniform gap of 2 subblocks. When each bandwidth is apart from its adjacent bandwidth by 2 subblocks and a system bandwidth is configured using 2 subblocks as a configuration granularity, at least 13 PA-Preamble sequences are defined to indicate the system bandwidths.

An irregular system bandwidth may be configured by dropping subblocks from the left and the right ends of a regular system bandwidth, symmetrically with respect to the DC or dropping a subband (subbands) only at the left or right side of the DC. It is typical in the nature of OFDMA to design a wireless system symmetrically with respect to DC. Therefore, preferably, an irregular system bandwidth is configured by dropping a pair of subblocks symmetrically with respect to the DC.

(3-2) Configuration of SA-Preamble

As described before with reference to FIG. 9, 5 MHz, 10 MHz and 20 MHz include 24 PRUs, 48 PRUs and 96 PRUs, respectively. Because 24 PRUs, 48 PRUs and 96 PRUs correspond to 8 subblocks, 16 subblocks and 32 subblocks, respectively, subblock-based dropping of a regular system bandwidth results in a TD-BW having an integer number of subblocks. Therefore, the length of an SA-Preamble is always equal to a TD-BW in Embodiment 3.

Figure 15:
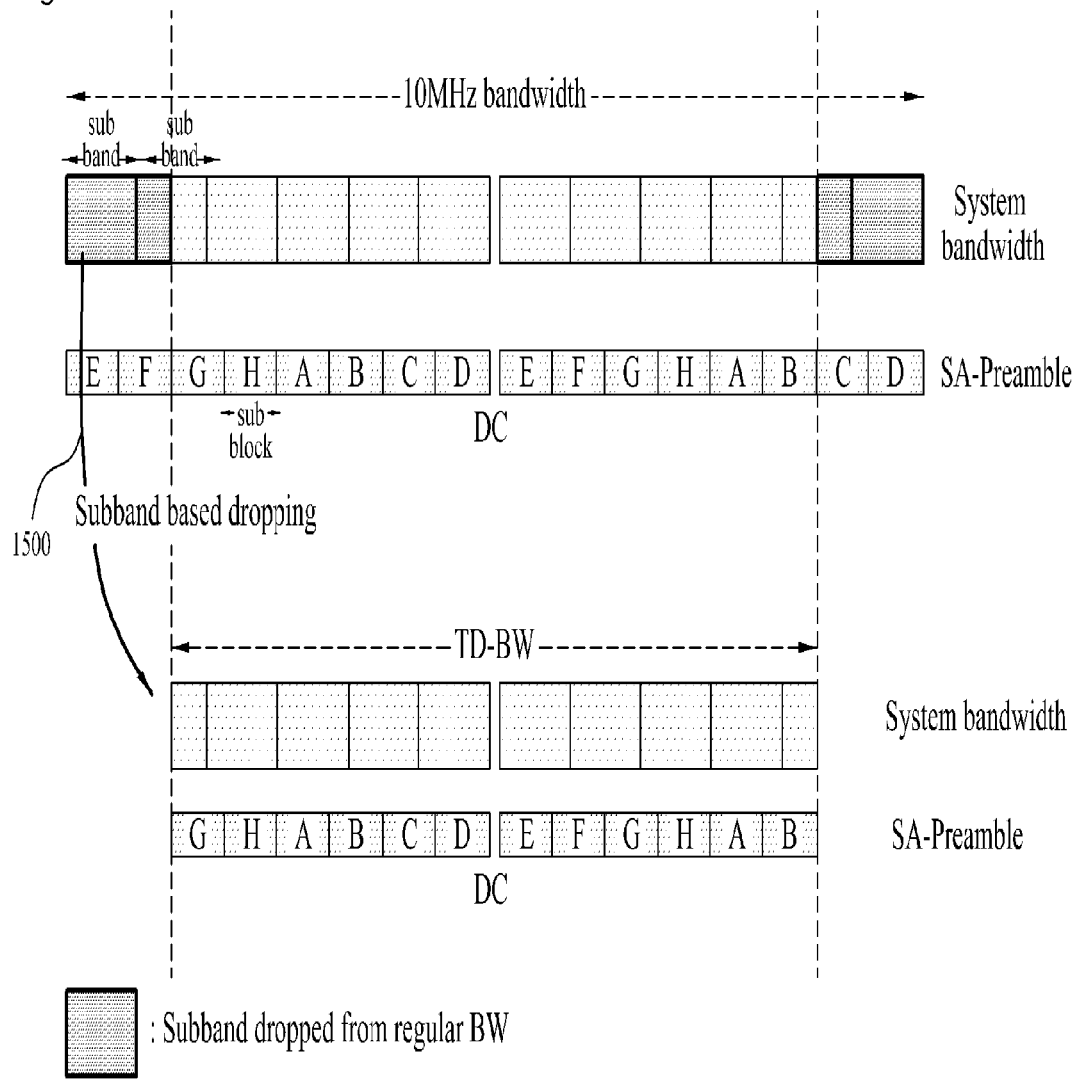
FIG. 15 illustrates configuring an irregular system bandwidth and an SA-Preamble according to a further embodiment of the present invention.

FIG. 15 illustrates configuring an irregular system bandwidth and an SA-Preamble according to a further embodiment of the present invention. Particularly, the 10-MHz regular system bandwidth is subject to subblock-based tone-dropping in FIG. 15.

Referring to FIG. 15, as indicated by reference numeral 1500, a TD-BW is created by dropping 2 subblocks from each of the left and right ends of a regular system bandwidth with respect to a DC component. As 2 subblocks are dropped from each end of the regular system bandwidth having 8 subblocks at each of the left and right sides, there are 6 subblocks at each side of the TD-BW. Therefore, an SA-Preamble including 6 sequence subblocks at each of the left and right sides with respect to the DC component may be configured.

For example, the SA-Preamble equal to the TD-BW in length may be configured by dropping as many subblocks as the number of subblocks dropped to configure the TD-BW from an SA-Preamble sequence corresponding to the regular system bandwidth. In another example, the SA-Preamble equal to the TD-BW in length may be configured by adding as many subblocks as the TD-BW.

In Embodiment 3, a one-to-one correspondence is established between an SA-Preamble and an irregular system bandwidth as well as between the SA-Preamble and a regular system bandwidth. Since a system bandwidth is equal to the length of the SA-Preamble, uncertainty or obscurity that may be involved in transmission or reception of an SA-Preamble may be eliminated.

In accordance with Embodiment 3, the BS processor 400*b* may configure a TD-BW by dropping 3 PRUs, that is, one or more subblocks from a regular system bandwidth and control the BS transmitter 100*b* to transmit a PA-Preamble sequence corresponding to the TD-BW. The BS transmitter 100*b* transmits the PA-Preamble sequence in the first symbol of the second frame F1 of a superframe under the control of the BS processor 400*b*. Since the TD-BW is an integer multiple of a subblock size, the BS processor 400*b* may configure an SA-Preamble with a length equal to the TD-BW. The BS transmitter 100*b* transmits the SA-Preamble in the first and third frames F0 and F2 of the superframe under the control of the BS processor 400*b*. The subcarrier mappers 140 to 140-K of the BS may map the SA-Preamble to subcarriers according to Math Figure 2 [Equation 2] under the control of the BS processor 400*b*. The SA-Preamble is transmitted to UEs on subcarriers determined by Math Figure 2 [Equation 2] in the first and third frames.

The UE receiver 300*a* receives the PA-Preamble and provides the PA-Preamble to the UE processor 400*a*. The UE processor 400*a* acquires system bandwidth information from the sequence of the PA-Preamble and adjusts the pass band of the reception filter in the UE receiver 300*a* according to the system bandwidth information. Because a system bandwidth indicated by the PA-Preamble is equal to the length of an SA-Preamble in Embodiment 3, the UE processor 400*a* may control the receiver 300*a* to configure a reception filter according to the system bandwidth. Alternatively, the UE processor 400*a* may acquire an SA-Preamble transmitted by the BS by detecting as many sequence subblocks as the TD-BW indicated by the PA-Preamble among SA-Preamble signals passed through a reception filter having a sufficiently large size. The UE processor 400*a* may acquire the cell ID of the BS based on the acquired SA-Preamble.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The embodiments of the present invention can be applied to a base station, a mobile station, or other communication devices in a wireless communication system.

The invention claimed is:

1. A method for transmitting a Secondary Advanced (SA)-Preamble supporting an irregular system bandwidth at a base station in a wireless communication system, the method comprising:
   transmitting a Primary Advanced (PA)-Preamble corresponding to the irregular system bandwidth to a user equipment; and
   transmitting the SA-Preamble corresponding to the irregular system bandwidth to the user equipment,
   wherein the SA-Preamble is configured by dropping a maximum number of pairs of SA-Preamble sequence subblocks that make a length of the SA-Preamble equal to or larger than the irregular system bandwidth, symmetrically with respect to a DC (direct current) component, from a plurality of SA-Preamble sequence subblocks corresponding to a regular system bandwidth.

2. The method according to claim 1, wherein the irregular system bandwidth is configured by dropping one or more pairs of subbands from the regular system bandwidth, symmetrically with respect to the DC component.

3. The method according to claim 1, wherein if the irregular system bandwidth is 5 MHz to 10 MHz, the SA-Preamble is configured based on a plurality of SA-Preamble sequence subblocks corresponding to a regular system bandwidth of 10 MHz, and if the irregular system bandwidth is 10 MHz to 20 MHz, the SA-Preamble is configured based on a plurality of SA-Preamble sequence subblocks corresponding to a regular system bandwidth of 20 MHz.

4. A base station for transmitting a Secondary Advanced (SA)-Preamble supporting an irregular system bandwidth in a wireless communication system, the base station comprising:
   a transmitter for transmitting a signal to a user equipment; and
   a processor for controlling the transmitter to transmit a Primary Advanced(PA)-Preamble corresponding to the irregular system bandwidth to the user equipment and the controlling transmitter to transmit the SA-Preamble corresponding to the irregular system bandwidth to the user equipment, wherein the SA-Preamble is configured by dropping a maximum number of pairs of SA-Preamble sequence subblocks that make a length of the SA-Preamble equal to or larger than the irregular system bandwidth, symmetrically with respect to a DC (direct current) component, from a plurality of SA-Preamble sequence subblocks corresponding to a regular system bandwidth.

5. The base station according to claim 4, wherein the processor configures the irregular system bandwidth by dropping one or more pairs of subbands from the regular system bandwidth, symmetrically with respect to the DC component.

6. The base station according to claim 4, wherein if the irregular system bandwidth is 5 MHz to 10 MHz, the SA-Preamble is configured based on a plurality of SA-Preamble sequence subblocks corresponding to a regular system bandwidth of 10 MHz, and if the irregular system bandwidth is 10 MHz to 20 MHz, the SA-Preamble is configured based on a plurality of SA-Preamble sequence subblocks corresponding to a regular system bandwidth of 20 MHz.

7. A method for receiving a Secondary Advanced (SA)-Preamble at a user equipment in a wireless communication system, the method comprising:

receiving a Primary Advanced (PA)-Preamble from a base station;

determining a system bandwidth supported by the base station based on a sequence of the PA-Preamble; and receiving the SA-Preamble corresponding to the system bandwidth from the base station, wherein if the system bandwidth is an irregular system bandwidth, the SA-Preamble is configured by dropping a maximum number of pairs of SA-Preamble sequence subblocks that make a length of the SA-Preamble equal to or larger than the irregular system bandwidth, symmetrically with respect to a DC (direct current) component, from a plurality of SA-Preamble sequence subblocks corresponding to a regular system bandwidth.

8. The method according to claim 7, wherein the irregular system bandwidth is configured by dropping one or more pairs of subbands from the regular system bandwidth, symmetrically with respect to the DC component.

9. The method according to claim 7, wherein if the irregular system bandwidth is 5 MHz to 10 MHz, the SA-Preamble is configured based on a plurality of SA-Preamble sequence subblocks corresponding to a regular system bandwidth of 10 MHz, and if the irregular system bandwidth is 10 MHz to 20 MHz, the SA-Preamble is configured based on a plurality of SA-Preamble sequence subblocks corresponding to a regular system bandwidth of 20 MHz.

10. The method according to claim 9, further comprising:
acquiring a cell Identifier (ID) of the base station based on the SA-Preamble.

11. A user equipment for receiving a Secondary Advanced (SA)-Preamble in a wireless communication system, the user equipment comprising:

a receiver for receiving a Primary Advanced (PA)-Preamble from a base station; and a processor for determining a system bandwidth supported by the base station based on a sequence of the PA-Preamble and controlling the receiver to receive the SA-Preamble corresponding to the system bandwidth from the base station, wherein if the system bandwidth is an irregular system bandwidth, the SA-Preamble is configured by dropping a maximum number of pairs of SA-Preamble sequence subblocks that make a length of the SA-Preamble equal to or larger than the irregular system bandwidth, symmetrically with respect to a DC (direct current) component, from a plurality of SA-Preamble sequence subblocks corresponding to a regular system bandwidth.

12. The user equipment according to claim 11, wherein the irregular system bandwidth is configured by dropping one or more pairs of subbands from the regular system bandwidth, symmetrically with respect to the DC component.

13. The user equipment according to claim 11, wherein if the irregular system bandwidth is 5 MHz to 10 MHz, the SA-Preamble is configured based on a plurality of SA-Preamble sequence subblocks corresponding to a regular system bandwidth of 10MHz, and if the irregular system bandwidth is 10 MHz to 20 MHz, the SA-Preamble is configured based on a plurality of SA-Preamble sequence subblocks corresponding to a regular system bandwidth of 20 MHz.

14. The user equipment according to claim 13, wherein the processor acquires a cell identifier (ID) of the base station based on the SA-Preamble.

* * * * *